US008988754B2

(12) United States Patent
Sun et al.

(10) Patent No.: US 8,988,754 B2
(45) Date of Patent: Mar. 24, 2015

(54) OPTICAL PHASED ARRAYS WITH EVANESCENTLY-COUPLED ANTENNAS

(71) Applicants: Jie Sun, Revere, MA (US); Michael R. Watts, Hingham, MA (US); Ami Yaacobi, Cambridge, MA (US); Erman Timurdogan, Cambridge, MA (US)

(72) Inventors: Jie Sun, Revere, MA (US); Michael R. Watts, Hingham, MA (US); Ami Yaacobi, Cambridge, MA (US); Erman Timurdogan, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/149,099

(22) Filed: Jan. 7, 2014

(65) Prior Publication Data
US 2014/0192394 A1    Jul. 10, 2014

Related U.S. Application Data

(60) Provisional application No. 61/749,967, filed on Jan. 8, 2013.

(51) Int. Cl.
*G02F 1/21* (2006.01)
*G02F 1/01* (2006.01)
*G02B 6/26* (2006.01)
*G02F 1/295* (2006.01)

(52) U.S. Cl.
CPC .............. *G02F 1/218* (2013.01); *G02F 1/0147* (2013.01); *G02B 6/26* (2013.01); *G02F 1/2955* (2013.01)
USPC .......................................... 359/238; 359/289

(58) Field of Classification Search
None
See application file for complete search history.

(56) References Cited

U.S. PATENT DOCUMENTS

| 4,759,595 A | 7/1988 | Boord et al. |
| 5,255,334 A | 10/1993 | Mak et al. |
| 5,542,012 A | 7/1996 | Fernandes et al. |
| 5,887,089 A | 3/1999 | Deacon et al. |

(Continued)

FOREIGN PATENT DOCUMENTS

| EP | 1146592 A1 | 10/2001 |
| JP | 2002-299942 A | 10/2002 |

(Continued)

OTHER PUBLICATIONS

Notification of Transmittal of the International Search Report and the Written Opinion of the International Search Authority for International Application No. PCT/US2014/010450 dtd Apr. 25, 2014, 10 pages.

(Continued)

*Primary Examiner* — Andrew Jordan
(74) *Attorney, Agent, or Firm* — Cooley LLP

(57) ABSTRACT

An optical phased array formed of a large number of nanophotonic antenna elements can be used to project complex images into the far field. These nanophotonic phased arrays, including the nanophotonic antenna elements and waveguides, can be formed on a single chip of silicon using complementary metal-oxide-semiconductor (CMOS) processes. Directional couplers evanescently couple light from the waveguides to the nanophotonic antenna elements, which emit the light as beams with phases and amplitudes selected so that the emitted beams interfere in the far field to produce the desired pattern. In some cases, each antenna in the phased array may be optically coupled to a corresponding variable delay line, such as a thermo-optically tuned waveguide or a liquid-filled cell, which can be used to vary the phase of the antenna's output (and the resulting far-field interference pattern).

27 Claims, 25 Drawing Sheets

(56) References Cited

U.S. PATENT DOCUMENTS

| | | | |
|---|---|---|---|
| 5,943,159 | A | 8/1999 | Zhu |
| 5,953,469 | A | 9/1999 | Zhou |
| 5,966,476 | A | 10/1999 | Hwang et al. |
| 6,128,421 | A | 10/2000 | Roberts |
| 6,246,809 | B1 | 6/2001 | Jouanno et al. |
| 6,333,712 | B1 | 12/2001 | Haugse et al. |
| 6,366,714 | B1 | 4/2002 | DeBoynton et al. |
| 6,404,943 | B1 | 6/2002 | Wang |
| 6,501,869 | B1 | 12/2002 | Athale |
| 6,650,807 | B2 | 11/2003 | Wang |
| 6,842,558 | B2 | 1/2005 | Mitsuoka et al. |
| 6,947,117 | B2 | 9/2005 | Anderson et al. |
| 6,987,901 | B2 | 1/2006 | Frick |
| 7,054,519 | B1 | 5/2006 | Novotny |
| 7,239,771 | B2 | 7/2007 | Ghandi et al. |
| 7,564,610 | B2 | 7/2009 | Fujimori |
| 7,657,129 | B2 * | 2/2010 | Karras ........................... 385/1 |
| 8,053,742 | B2 | 11/2011 | Lundquist et al. |
| 8,200,055 | B2 | 6/2012 | Subbaraman et al. |
| 8,346,086 | B2 | 1/2013 | Suzuki et al. |
| 8,467,641 | B2 | 6/2013 | Krill et al. |
| 8,471,230 | B2 | 6/2013 | Zhong et al. |
| 8,483,526 | B2 | 7/2013 | Sun et al. |
| 2002/0114559 | A1 | 8/2002 | Wang |
| 2006/0083457 | A1 | 4/2006 | Nicolaescu et al. |
| 2006/0091305 | A1 | 5/2006 | Grunnet-Jepsen et al. |
| 2007/0058686 | A1 * | 3/2007 | Capasso et al. ........... 372/43.01 |
| 2009/0060409 | A1 * | 3/2009 | Karras ........................... 385/2 |
| 2009/0148097 | A1 | 6/2009 | Hyde et al. |
| 2012/0120059 | A1 | 5/2012 | Bratkovski et al. |
| 2013/0322892 | A1 | 12/2013 | Aflatouni et al. |
| 2014/0192394 | A1 * | 7/2014 | Sun et al. ..................... 359/289 |

FOREIGN PATENT DOCUMENTS

| | | |
|---|---|---|
| JP | 2010-028236 A | 2/2010 |
| WO | WO 02/099896 | 12/2002 |

OTHER PUBLICATIONS

Cherry, M., Astronomy in South Africa: the longshot. Nature 480, 308-309 (2011).

McManamon, P. F. et al., Optical phased array technology. Proc. IEEE84, 268-298 (1996) (Abstract).

Meyer, R. A., Optical beam steering using a multichannel lithium tantalite crystal, Applied Optics, vol. 11, No. 3, 613-616 (1972).

Resler, D. P., High-efficiency liquid-crystal optical phased array beam steering, Optical Society of America, Optics Letters, vol. 21, No. 9 (1996).

Ng, W. et al., The first demonstration of an optically steered microwave phased array antenna using true-time-delay, Journal of Lightwave Technology, vol. 9, 1124-1131 (1991).

Kwong, D., Hosseini, A., Zhang,Y.& Chen, R.T., 1×12unequallyspacedwaveguide array for actively tuned optical phased array on a silicon nanomembrane, Applied Physics Letters 99, 051104-051104-3 (2011).

Carlson, N. W. et al., Electronic beam steering in monolithic grating-surface emitting diode laser arrays. Appl. Phys. Lett. 53, 2275-2277 (1988).

Doylend, J.K. et al., Two-dimensional free-space beam steering with an optical phased array on silicon-on-insulator, Optics Express, vol. 19, No. 22, 21595-21604 (2011).

Doylend, J. K. et al., Free-space beam steering in two dimensions using a silicon optical phased array, OFC/NFOEC Technical Digest (2012).

Van Acoleyen, K., et al., Integrated optical beam steerers, OFC/NFOEC, Technical Digest (2013).

Van Acoleyen, K., et al., Two-dimensional optical phased array antenna on silicon-on-insulator, Optics Express, vol. 18, No. 13, 13655-13660 (2010).

Van Acoleyen, K., et al., Off-chip beam steering with a one-dimensional optical phased array on silicon-on-insulator, Optics Letters, 34, 1477-1479 (2009).

Yu, N. et al., Light propagation with phase discontinuities: generalized laws of reflection and refraction, Science, vol. 334, 333-337 (2011).

Yaacobi, A., Timurdogan, E. & Watts, M. R., Vertical emitting aperture nanoantennas, Optics Letters. 37, 1454-1456 (2012).

Abeles, J. H. & Deri, R.J., Suppression of side lobes in the far-field radiation patterns of optical waveguide arrays, Appl. Phys. Lett. 53, 1375-1377 (1988).

Tang, L. et al., Nanometre-scale germanium photo detector enhanced by a near-infrared dipole antenna, Nature Photonics, vol. 2, 226-229 (2008).

Johnson, M.T., et al., High-speed beam steering with phased vertical cavity laser arrays, IEEE Journal of Selected Topics in Quantum Electronics, vol. 19, No. 4, 1701006 (2013).

Juswardy, B., Photonic true-time delay unit for broadband adaptive nulling in antenna arrays, Opt. Quant. Electron, 41:819-826 (2009).

Sun, J., et al., Large-scale nanophotonic phased array, Nature 11727, vol. 493 (2013).

Tang, S., et al., Polymer-based optical waveguide circuits for photonic phased array antennas, Part of the SPIE Conference on Optoelectronic Interconnects VI, SPIE vol. 3632, 250-261 (1999).

Muhlschlegel, P. et al., Resonant optical antennas, Science 308, 1607-1609 (2005).

Schuck, P. J., Fromm, D. P., Sundaramurthy, A., Kino, G. S. & Moerner, W. E., Improving the mismatch between light and nanoscale objects with gold bowtie nanoantennas, The American Physical Society, Phys. Rev. Lett. 94, 017402-1-017402-4 (2005).

Kosako, T., Kadoya, Y. & Hofmann, H. F., Directional control of light by a nano-optical Yagi-Uda antenna, Nature Photonics, vol. 4, 312-315 (2010).

Alu, A. & Engheta, N., Tuning the scattering response of optical nanoantennas with nanocircuit loads, Nature Photon., vol. 2, 307-310 (2008).

Roelkens, G., Van Thourhout, D. & Baets, R., High efficiency silicon-on-insulator grating coupler based on a poly-silicon overlay, Opt. Express 14, 11622-11630 (2006).

Gerchberg, R. W. & Saxton, W. O., A practical algorithm for the determination of phase from image and diffraction plane pictures, Optik (Stuttg.), vol. 35, 237-246 (1972).

Flenup, J. R., Reconstruction of an object from the modulus of its Fourier transform, Optical Society of America, vol. 3, No. 1, 27-29 (1978).

Le Thomas, N. et al., Exploring light propagating in photonic crystals with Fourier optics, Optical Society of America ,B/vol. 24, No. 12, 2964-2971 (2007).

Padgett, M., Courtial, J. & Allen, L., Light's orbital angular momentum, American Institute of Physics, Physics Today, 35-40 (2004).

Xia, C. et al., Supermodes for optical transmission, Opt. Express, vol. 19, No. 17, 16653-16664 (2011).

DeRose, C. T. et al., Low power and broadband 2 ×2 silicon thermo-optic switch, Optical Society of America, OThM3 (2011).

DeRose, C. T. et al., Low power and broadband 2 x2 silicon thermo-optic switch, Optical Society of America, OThM3 (2011).

DeRose, C.T. et al., Electronically controlled optical beam-steering by an active phased array of metallic nanoantennas, Optical Society of America, Optics Express, vol. 21, No. 4, 5198-5208 (2013).

Guo, W., et al., Two-dimensional optical beam steering with InP-Based Photonic Integrated Circuits, IEEE Journal of Selected Topics in Quantum Electronics, vol. 19, No. 4, 6100212 (2013).

Guo, W., et al., InP photonic integrated circuit with on-chip tunable laser source for 2D optical beam steering, Optical Society of America, OFC/NFOEC Technical Digest (2013).

Watts, M. R., "Silicon Photonics in High Performance Computing," Massachusetts Institute of Technology Optics and Quantum Electronics Seminar Series, Dec. 2, 2009, pp. 59-60.

US 7,742,664, 06/2010, Anderson et al. (withdrawn)

* cited by examiner

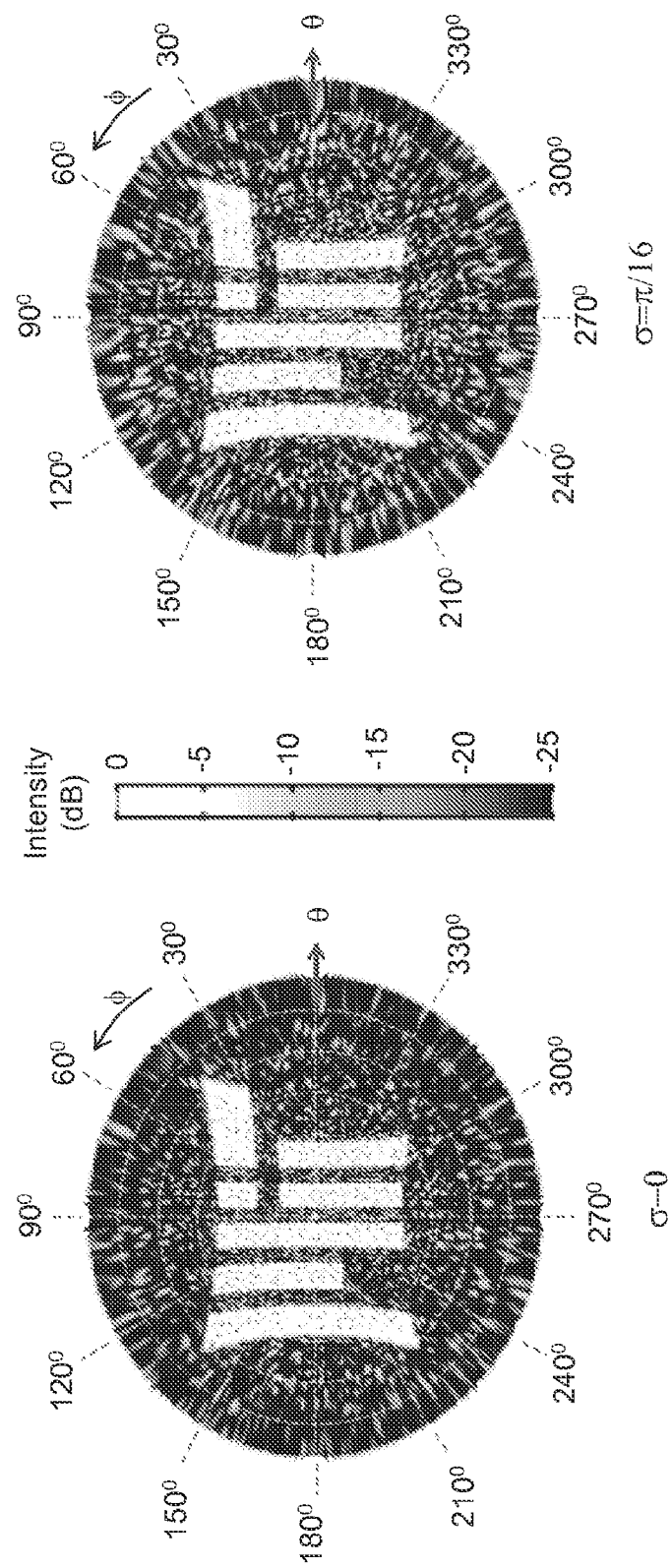

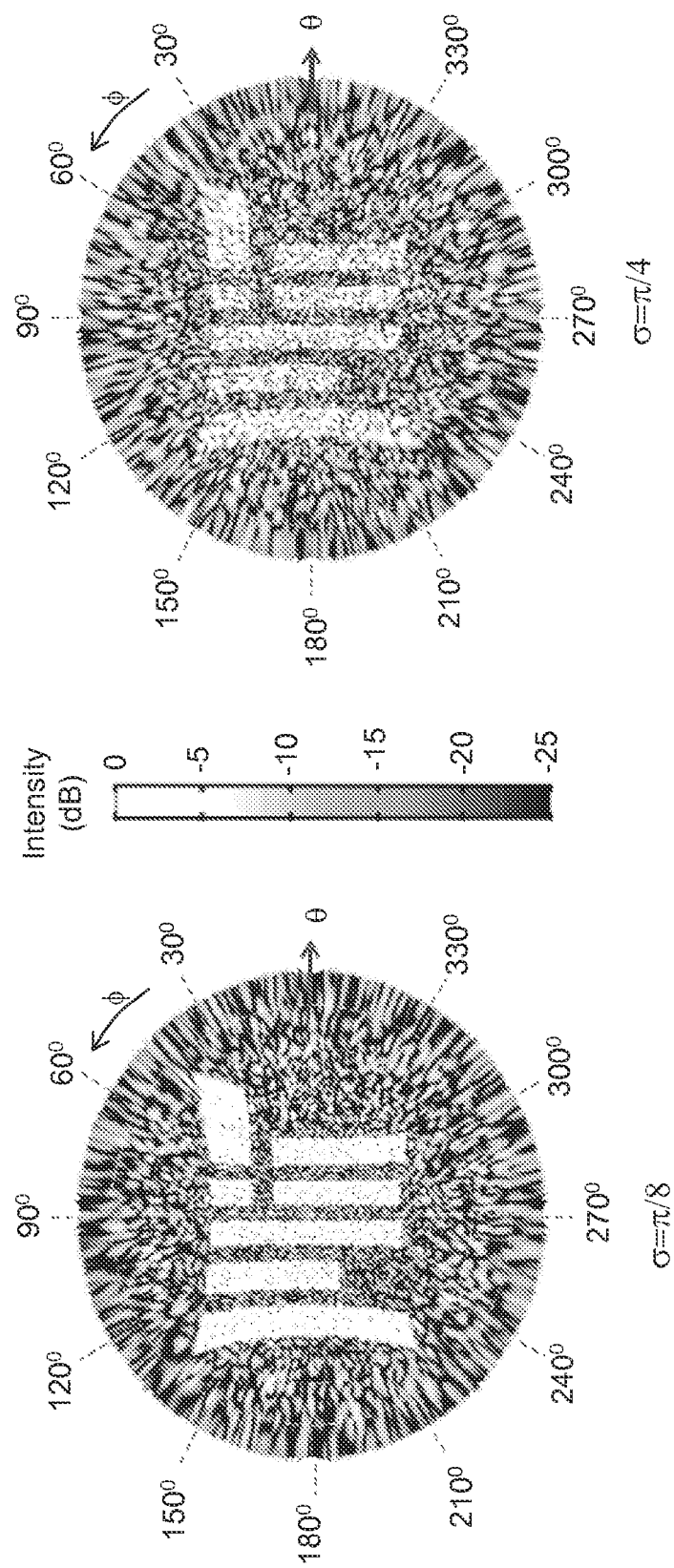

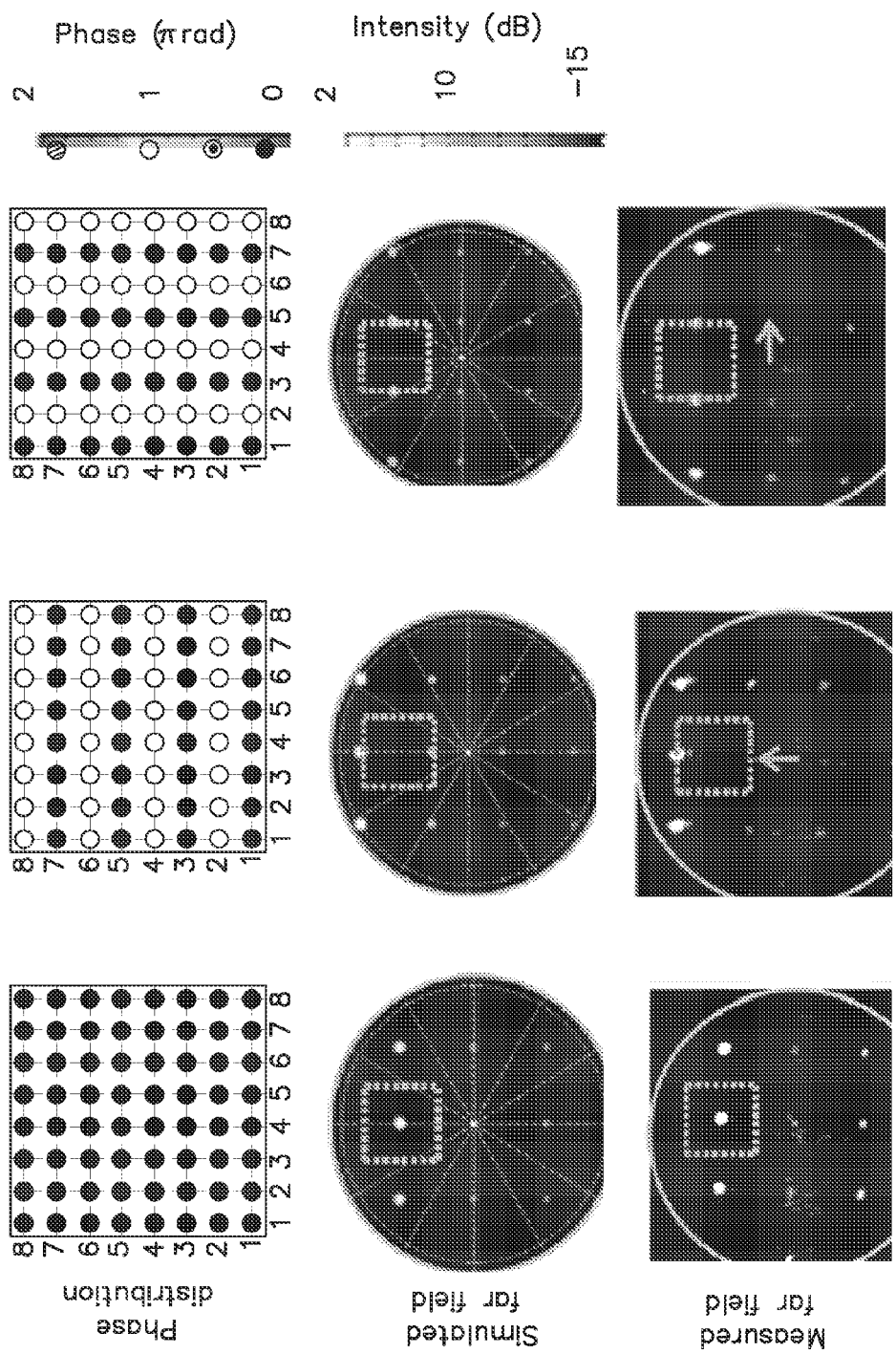

OPTICAL PHASED ARRAYS WITH EVANESCENTLY-COUPLED ANTENNAS

CROSS-REFERENCE TO RELATED PATENT APPLICATION

This application claims priority, under 35 U.S.C. §119(e), from U.S. Provisional Application 61/749,967, filed Jan. 8, 2013, entitled "Large-Scale Nanophotonic Phased Array," which application is hereby incorporated herein by reference in its entirety.

GOVERNMENT SUPPORT

This invention was made with government support under Contract No. HR0011-12-2-0007 awarded by the Defense Advanced Research Projects Agency and under Grant No. DE-AC04-94AL85000 awarded by the Department of Energy. The government has certain rights in the invention.

BACKGROUND

Electromagnetic phased arrays at radio frequencies are well known and have enabled applications ranging from communications to radar, broadcasting and astronomy. The ability to generate arbitrary radiation patterns with large-scale phased arrays has long been pursued. Although it is extremely expensive and cumbersome to deploy large-scale radio frequency phased arrays, optical phased arrays have a unique advantage in that the much shorter optical wavelength holds promise for large-scale integration. However, the short optical wavelength also imposes stringent requirements on fabrication. As a consequence, although optical phased arrays have been studied with various platforms and recently with chip-scale nanophotonics, the optical phased arrays demonstrated to date have been one-dimensional arrays or small-scale two-dimensional arrays.

SUMMARY

Embodiments of the present invention include an optical phased array for forming a far-field radiation pattern from a coherent optical beam having a free-space wavelength $\lambda_0$ and corresponding methods of forming far-field radiation patterns using an optical phased array. One example of the optical phased array includes at least one waveguide that is evanescently coupled to a plurality of antenna elements disposed in the same plane as the waveguide. In operation, the waveguide guides the coherent optical beam to the antenna elements, which to emit respective portions of the coherent optical beam so as to form the far-field radiation pattern.

In some cases, the optical phased array comprises a column waveguide that is evanescently coupled one or more row waveguides. The column waveguide guides the coherent optical beam in a first direction to the row waveguides, which guide respective portions of the coherent optical beam the antenna elements. For instance, the optical phased array may include a first row waveguide that is evanescently coupled to the column waveguide via a first directional coupler with a first coupling efficiency and a second row waveguide that is evanescently coupled to the column waveguide via a second directional coupler having a second coupling efficiency. Depending on the implementation, the first coupling efficiency may be smaller than the second coupling efficiency, e.g., to ensure that the amount of optical power coupled into the first row waveguide is about equal to the amount of optical power coupled into the second row waveguide. If desired, the waveguides can be formed via a complementary metal-oxide-semiconductor (CMOS) process.

The antenna elements in the optical phased array can be spaced at any appropriate pitch, including a pitch about equal to an integer multiple of $\lambda_0/2$ or a pitch of less than or equal to about $\lambda_0/2$. The antenna elements may also emit respective portions of the coherent optical beam that are of approximately equal amplitude. In some cases, each antenna element may include a grating that diffracts at least part of the corresponding portion of the coherent optical beam so as to form the far-field radiation pattern. Each grating may have a full-width, half-maximum diffraction bandwidth of at least about 100 nm. And each grating may be configured to suppress resonant back-reflection of the corresponding respective portion of the coherent optical beam.

In some cases, the optical phased array may include a plurality of variable optical delay lines, each of which is in optical communication with a corresponding antenna element. In operation, this variable optical delay line can be used to shift the phase of a corresponding portion of the coherent optical beam so as to vary an amplitude distribution of the far-field radiation pattern and/or to compensate for phase error in the at least one waveguide. Each variable optical delay line may be actuated by a corresponding heater, such as a resistive heater formed in a doped semiconductor. In operation, the heater heats at least a portion of the variable optical delay line so as to change the shift in phase imparted on the corresponding portion of the coherent optical beam by the variable optical delay line. A controller operably coupled to the heater may control the heater's temperature so as to vary the far-field radiation pattern via a change in the shift in phase imparted on the corresponding portion of the coherent optical beam by the variable optical delay line.

In another embodiment, the optical phased array comprises a substrate, a column waveguide, a plurality of directional couplers, a plurality of row waveguides, a plurality of phase shifters, a plurality of antenna elements, and a plurality of controllable heaters. The column waveguide, directional couplers, row waveguides, phase shifters, and antenna elements are formed in or on the substrate. In operation, the column waveguide guides a coherent optical beam having a free-space wavelength of about $\lambda_0$ to the directional couplers, which evanescently couple respective portions of the coherent optical beam from the column waveguide to the row waveguides. The row waveguides guide and evanescently couple portions of these "row beams" to the phase shifters, each of which imparts a corresponding phase shift to a corresponding portion of the corresponding row beam so as to produce a corresponding phase-shifted beam. Each phase shifter couples its corresponding phase-shifted beam to a particular antenna element in the plurality of antenna elements. The antenna elements emit the phase-shifted beams at an angle with respect to the substrate so as to form the far-field radiation pattern. And the controllable heaters heat the phase shifters so as to vary the phase shifts, which in turn varies the far-field radiation pattern and/or compensates for phase errors in the column waveguide and/or the row waveguides.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 7A-7D are simulated far-field array factor patterns with different phase noise levels simulated by adding Gaussian phase noise $\in_{mn}$ with standard deviations of $\sigma$=0 (i.e., no phase noise; FIG. 7A), $\sigma$=$\pi$/16 (FIG. 7B), $\sigma$=$\pi$/8 (FIG. 7C), and $\sigma$=$\pi$/4 (FIG. 7D) to the ideal phase $\phi_{mn}$.

FIGS. 11A-11E illustrates the phase distributions (top row), simulated far-field radiation patterns (middle row), and measured far-field radiation patterns (bottom row) of the optical phased array of FIG. 2A emitting a boresight beam (FIG. 11A), a focused beam steered vertically by 6° (FIG. 11B), a focused beam steered horizontally by 6° (FIG. 11C), a single beam split vertically into two beams (FIG. 11D), and a single beam split horizontally into four beams (FIG. 11E).

DETAILED DESCRIPTION

Figure 1A:
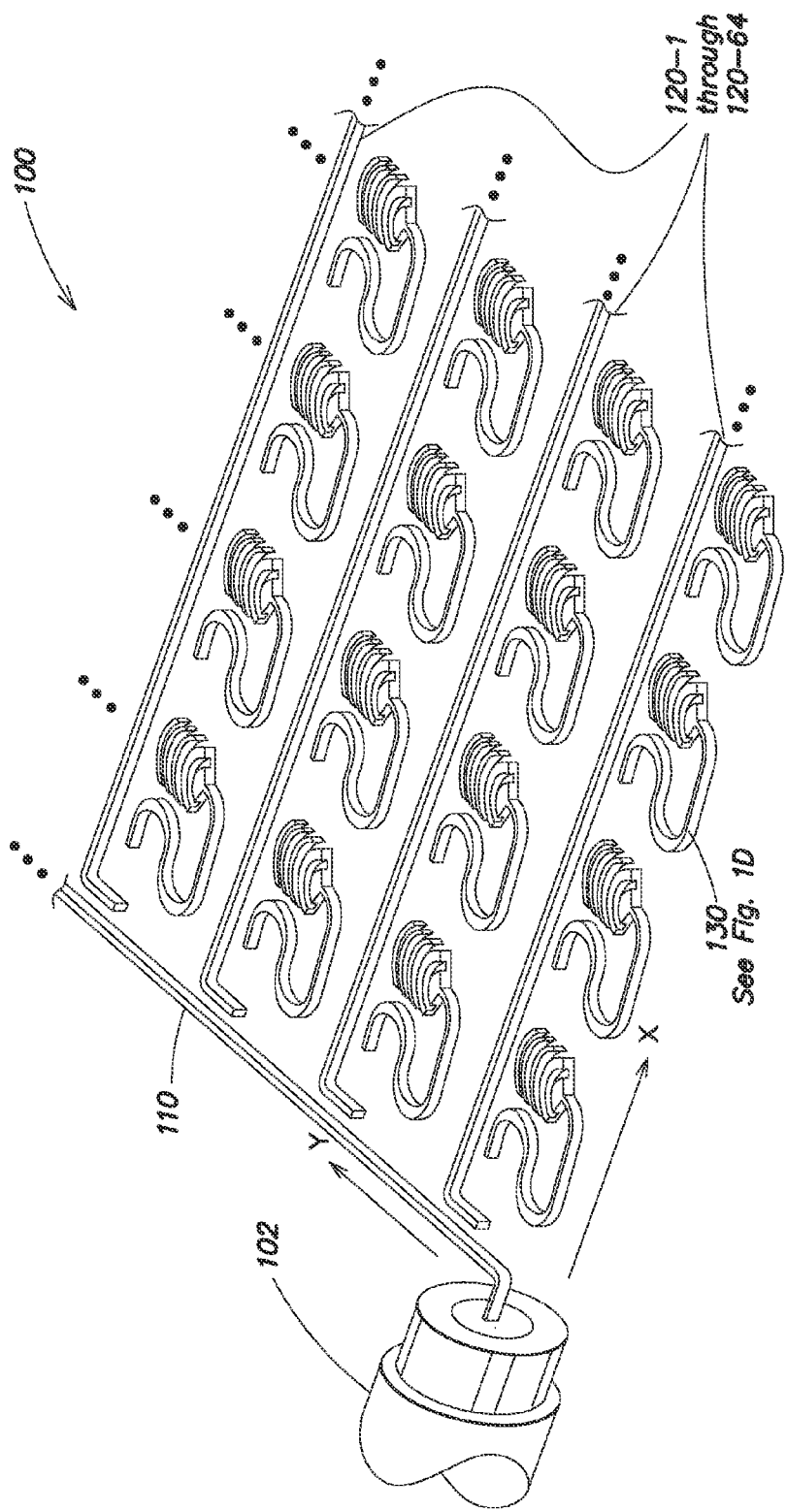
FIG. 1A illustrates a 64×64 element optical phased array (the inset shows a unit cell, or pixel, of the optical phased array).

Examples of the present technology include a large-scale, two-dimensional optical phased array, also called a nanophotonic phased array (NPA), with optical nanoantennas that are densely integrated on a silicon chip within a relatively small footprint. For instance, an exemplary NPA may include 4,096 antenna elements arranged in a 64×64 element array in an area of about 576 µm×576 µm. The robust NPA designs disclosed herein, together with state-of-the-art complementary metal-oxide-semiconductor technology, allows large-scale NPAs to be implemented on compact and inexpensive nanophotonic chips.

An NPA, like its radio-frequency (rf) counterparts, comprises an array of optical antennas, also known as nanoantennas, nanophotonic antennas, antenna elements, or simply elements. For instance, an NPA may include a set of identical optical antennas arranged in a periodic, two-dimensional array with the elements separated by a distance on the order of an optical wavelength. In other examples, the array may be aperiodic (e.g., random or sparse) and/or one-dimensional. Each optical antenna in the array emits light of a specific amplitude and phase. These emissions interfere to form a desired far-field radiation pattern. Varying the amplitudes and/or phases of the beams emitted by the optical antennas causes the far-field radiation pattern to change.

Because light has a relatively short wavelength (e.g., a wavelength on the order of one micron), an NPA can include thousands or even millions of antenna elements in a compact, low-cost chip. By incorporating a large number of antennas, an NPA can generate a high-resolution far-field pattern, including almost arbitrary radiation patterns, which gives the NPA functionalities beyond conventional beam focusing and steering. However, the short optical wavelength also presents challenges in realizing coherent outputs from such large-scale NPAs because even nanoscale fluctuations affect the ability to balance the phases and powers of the optical emission from the thousands of nanoantennas that are balanced in power and aligned in phase to form a specific far-field radiation pattern. As a consequence, the chip-based, two-dimensional NPAs demonstrated to date have been small-scale implementations with no more than 16 antenna elements and functionalities constrained to focusing and steering a single beam.

In contrast, examples of the NPAs disclosed here can include many more antenna elements and can be fabricated using complementary metal-oxide-semiconductor (CMOS) processes. In one example, an NPA comprises 64×64 optical nanoantennas on a silicon chip with all 4,096 optical nanoantennas balanced in power and aligned in phase to produce a particular radiation pattern (e.g., the MIT logo) in the far field. (In optics, the far field is typically defined as the region for which the Fraunhofer approximation applies, i.e., distances greater than or equal to about $L > W^2/\lambda$, where W is the size of the aperture and $\lambda$ is the wavelength of the emitted light.) This power balance and phase alignment may be fixed to ensure repeatable production of a particular far-field radiation pattern. Experimental results show that despite the short optical wavelength and corresponding length of the phase elements, the phases of the beams emitted by the antenna elements can be maintained, highlighting the ability to make arbitrary manipulations of the phase of an optical field within a nanophotonic chip.

In other examples, each antenna element in the array includes a corresponding phase tuner for active phase tuning Tuning the relative phases of the antenna elements in the NPA makes it possible to dynamically steer and/or shape the beam emitted by the NPA. Dynamic phase tuning with large numbers of antenna elements also enables generation of more sophisticated far-field radiation patterns, extending the functionalities of phased arrays beyond beam focusing and beam steering.

The large number of nanoantennas and the embedded phase tunability enable NPAs to generate arbitrary far-field radiation patterns dynamically and, in turn, to affect new fields such as communication, LADAR, three-dimensional holography, biological and environmental sensing, and biomedical sciences. For instance, an exemplary NPA could be used in a (low-cost) LIDAR suitable for use in cars, trucks, satellites, robots, etc. The ability to take advantage of CMOS integration process also promises a bright future for low-cost and compact NPAs.

Optical Phased Arrays with Evanescently Coupled Buses and Nanoantennas

FIGS. 1A-1D illustrate an optical phased array 100 formed using a CMOS integration process. As shown in FIG. 1A, the optical phased array 100 includes 4,096 unit cells (pixels) 130 arranged in 64 pixel×64 pixel grid at a pitch of about $\lambda_0/2$, where $\lambda_0$ is the wavelength of the beam(s) emitted by the optical phased array 100. An optical fiber 102 couples light from a laser or other coherent light source (not shown) into a column bus waveguide 110, which in turn evanescently couples light into 64 row bus waveguides 120-1 through 120-64 (collectively, row bus waveguides 120). Each row bus waveguide 120 in turn evanescently couples light into 64 pixels 130, which emit light to form a predetermined far-field emission pattern.

In this optical phased array 100, the coupling to the row bus waveguides 120 is controlled in such a way that each row bus waveguide 120 obtains the same amount of power as described in greater detail below. The optical power in each row bus waveguide 120 is then similarly divided among the 64 pixels 130 coupled to that row bus waveguide 120 so that all 4,096 optical nanoantennas in the optical phased array 100 are uniformly excited. Because each pixel 130 receives an equal portion of the optical power provided by the optical fiber 102, differences in the relative phases of the beams emitted by the pixels 130 determine the optical phased array's far-field emission pattern. In other examples, the optical power coupled into and/or out of each pixel 130 may be weighted, attenuated, or amplified to produce a pixel-by-pixel variation in the emitted power to produce a particular far-field radiation pattern.

In this example, the pixel pitch is less than half of the free-space wavelength, $\lambda_0$, of the optical emission in both the x and y directions. Because the pixel pitch is less than $\lambda_0/2$, then the optical phased array 100 can produce a unique interference pattern in the far field without high-order radiation lobes. For pixel pitches greater than $\lambda_0/2$, the optical phased array 100 may produce (possibly undesired) high-order interference patterns in the far field in addition to the desired far-field radiation pattern. In other words, the optical phased array 100 may produce aliased versions of the desired pattern in the far field.

Power Management in a Nanophotonic Phased Array

In phased arrays, the amplitudes of the pixels' respective emissions affect the far-field radiation pattern. Undesired variations in these amplitudes may corrupt or otherwise degrade the optical phased array's far-field radiation pattern. Preventing undesired amplitude variations often becomes more challenging (and more important) in larger arrays. Thus, in large arrays (e.g., arrays with thousands of pixels), the power feeding network should deliver optical power reliably and precisely to each antenna element.

Figure 1B:
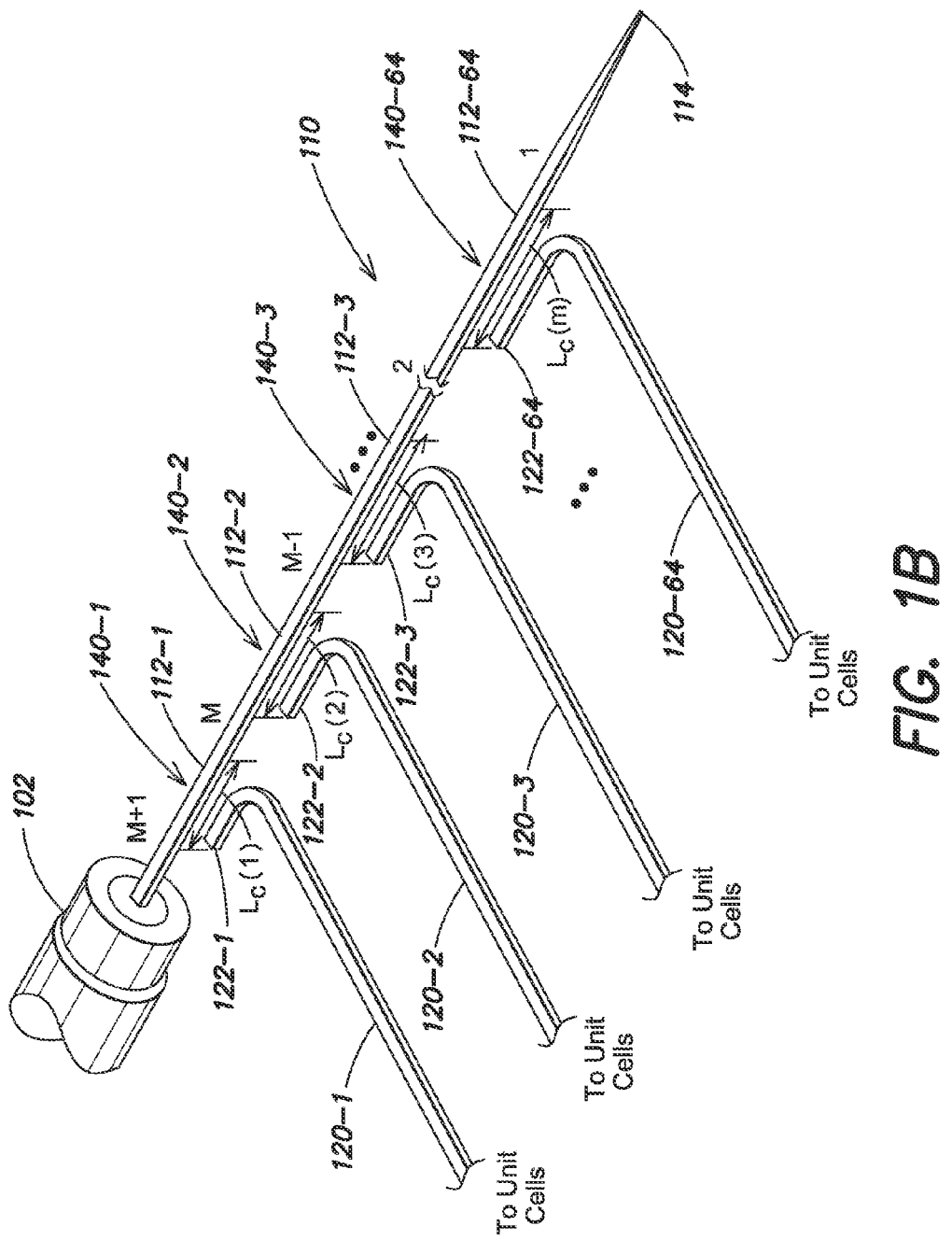
FIG. 1B shows a power feeding network suitable for use in the optical phased array of FIG. 1A with a bus waveguide that couples equal amounts of optical power to multiple row waveguides.

FIG. 1B illustrates the optical phased array's power feeding network—the column bus waveguide 110 and the row bus waveguides 120—in greater detail. The column bus waveguide 110 and row bus waveguides 120 may be formed of silicon waveguides (e.g., silicon-on-insulator waveguides) as understood in the art of CMOS processing and CMOS electronics. The column bus waveguide 110 is butt-coupled to the optical fiber 102, which launches an optical beam into a single transverse mode supported by the column bus waveguide 110.

The optical beam propagates along the column bus waveguide 110 through a series of column-to-row directional couplers 140-1 through 140-64 (collectively, directional couplers 140), each of which couples a corresponding portion of the optical beam into a corresponding row bus waveguide 120. The directional couplers 140-1 through 140-64 shown in FIG. 1B are four-port, passive devices formed by respective column coupling regions 112-1 through 112-64 (collectively, coupling regions 112) of the column bus waveguide 110. In each directional coupler 140, the column coupling region 112 runs parallel to and spaced apart from a row coupling region 122-1 through 122-64 (collectively, coupling regions 122) in the corresponding row bus waveguide 120-1 through 120-64.

In operation, light propagating through a given column coupling region 112-$m$ evanescently couples into the adjacent row coupling region 122-$m$, where m represents the row number. As understood by those of skill in the art, the proportion of optical power transferred from the column coupling region 112-$m$ into the row coupling region 122-$m$ varies as a function of the coupling regions' optical path lengths, $L_c(m)$, and the optical path length separating the column coupling region 112-$m$ from the row coupling region 122-$m$. To provide equal power to each row, the directional couplers' lengths $L_c(m)$ are varied to change the coupling ratio in such a way that the $m^{th}$ (1<M<M) row bus waveguide has a coupling efficiency of 1/(M+2−m), where M is the highest row number (in this case, M=64). The desired coupling ratios (and coupler lengths) can be obtained through a three-dimensional finite-difference time-domain simulation or any other suitable technique. For the 64 pixel×64 pixel optical phased array 100 shown in FIG. 1A, the bus-to-row coupler length $L_c(m)$ varies from about 3.53 μm (a coupling efficiency of about 1.54%) for m=1 to about 8.12 μm (a coupling efficiency of about 50%) for m=64 in order to distribute power equally among the row bus waveguides 120.

In other examples, the power distribution across the optical phased array may be non-uniform. For instance, the power distribution may have a Gaussian or exponentially decaying envelope to provide a Gaussian or Lorentzian shape to the beams emitted by the optical phase array. Similarly, the directional couplers' coupling ratios can be changed by varying the separation distance between the coupling regions 112 and 122 instead of or in addition to varying the coupler length. The coupling efficiency tends to be less sensitive to variations in coupler length than to variations in the separation distance, however, so directional couplers 140 with varying lengths tend to have looser fabrication tolerances than directional couplers with varying separation distances.

Some optical phased arrays may also include tuning mechanisms for varying the power distribution across the array, e.g., to change or scan the far-field pattern. For instance, each directional coupler may include an interferometer, such as a Mach-Zehnder modulator or ring resonator, with an input port coupled to the column bus waveguide, a first output port coupled to the column bus waveguide, and a second output port coupled to the row bus waveguide. Tuning the interferometer with an electric field (e.g., via electrodes) or magnetic field (e.g., via electro-magnets) changes its coupling ratio, allowing adjustment of the optical power coupled from the column bus waveguide into the row bus waveguide.

In other embodiments, one or more of the row bus waveguides may include a variable optical attenuators at or near its optical connection with the column bus waveguide. Actuating the variable optical attenuator reduces the optical power propagating through the corresponding row bus waveguide. Alternatively, or in addition, the column bus waveguide may also include one or more variable optical attenuators, e.g., distributed between the successive directional couplers. Actuating a variable optical attenuator in the column bus waveguide reduces the optical power available for coupling into the row bus waveguide(s) downstream from the variable optical attenuator.

Figure 1C:
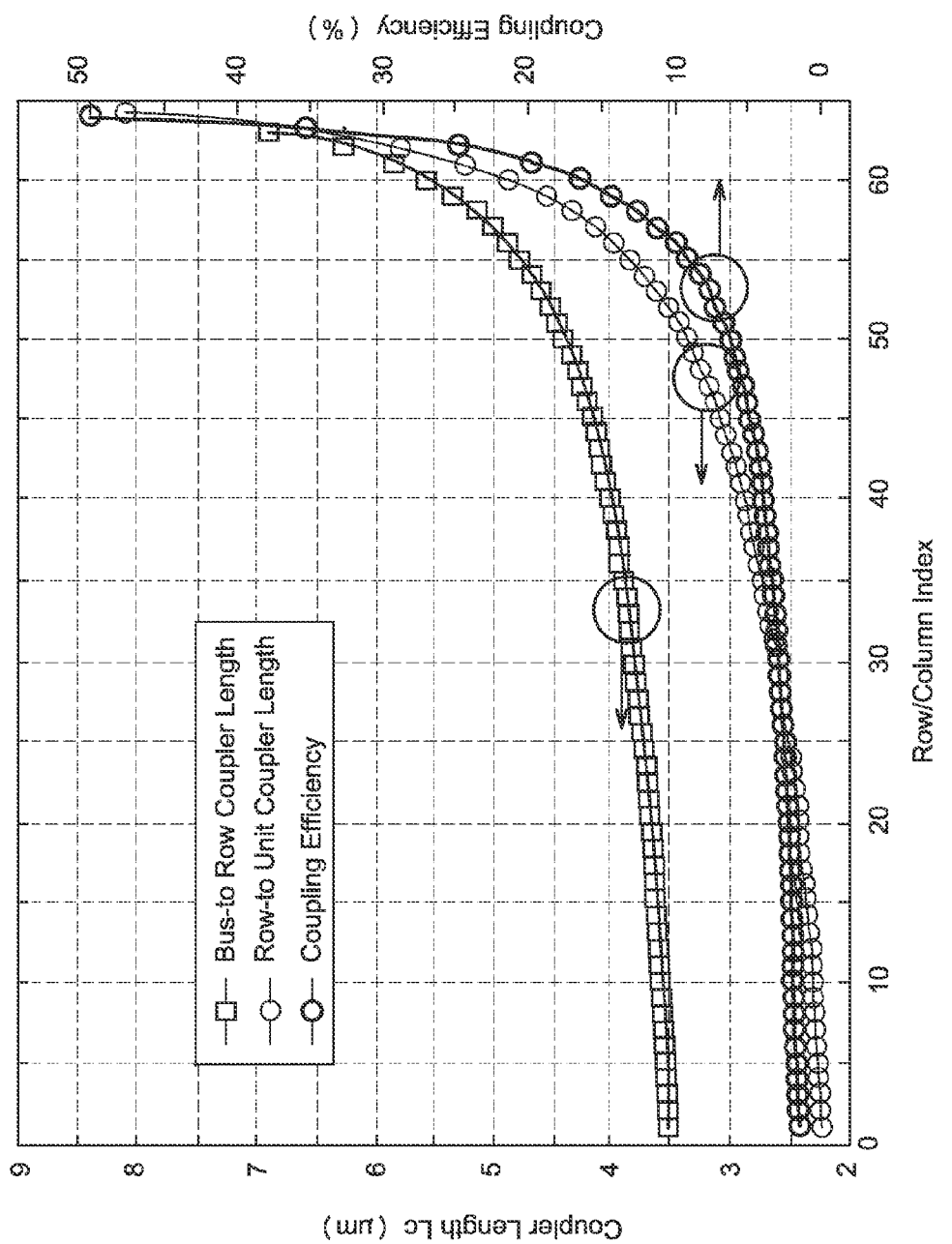
FIG. 1C is a plot of the coupler length (left axis) and coupling efficiency (right axis) versus row/column index for the bus-to-row couplers (upper curve) and the row-to-unit couplers (middle curve) in the 64×64 nanophotonic phased array of FIG. 1A.

FIG. 1C is a plot that illustrates the performance of the power feeding network in the optical phased array 100 of FIGS. 1A-1C. It shows the coupler length (left axis) and coupling efficiency (right axis) versus row/column index for the directional couplers that connect the column bus waveguide 110 to the row bus waveguides 120 and for the row-to-pixel directional couplers (described below with respect to FIG. 1D) that connect the row bus waveguides 120 to the pixels 130 in the optical phased array 100 of FIG. 1A. (The lengths of row-to-pixel directional couplers are different than those of the column-to-row directional couplers 140 because the row-to-pixel directional couplers have different bend radii than the column-to-row directional couplers 140.)

Nanoantenna Design and Phase Management

Figure 1D:
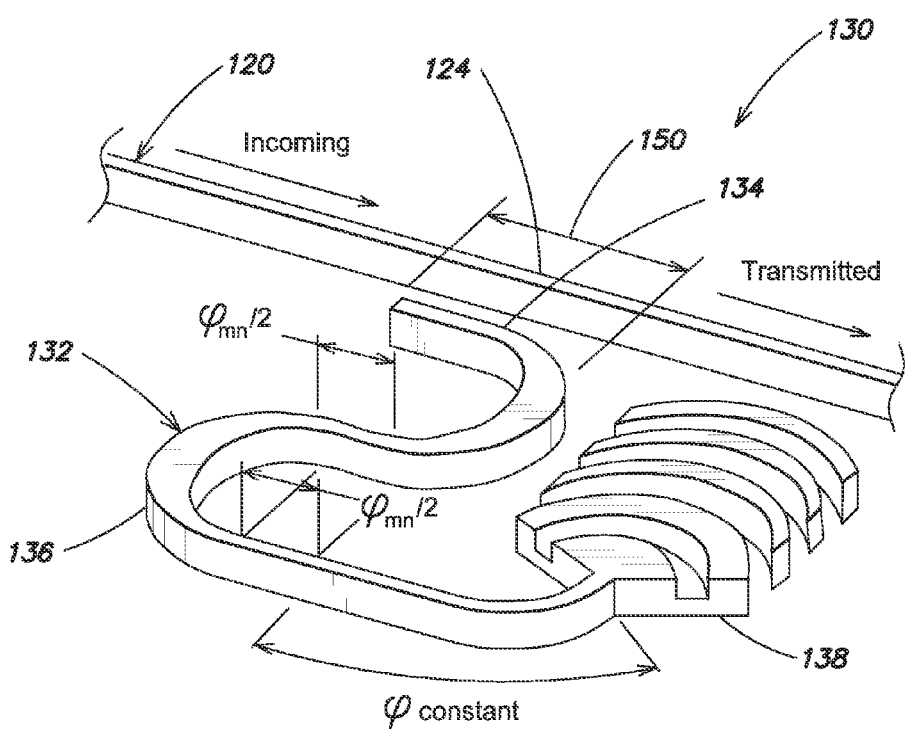
FIG. 1D shows a unit cell (pixel) of the optical phased array of FIG. 1A with a directional coupler, phase shifter, and nanophotonic antenna element.

FIG. 1D shows a pixel 130 in the optical phased array 100 of FIG. 1A in greater detail. The pixel 130 includes a pixel waveguide 132 that is formed using the same CMOS process used to form the column bus waveguide 110 and the row bus waveguides 120. In some cases, all of these waveguides may be formed of the same semiconductor material, such as silicon or silicon nitridge, on a layer of dielectric cladding, such as silicon oxide ($SiO_x$). Depending on their refractive indices and cross-sectional dimensions, these waveguides may guide light at visible wavelengths or infrared wavelengths. To guide light at a wavelength of 1550 nm, for example, the waveguides may be about 220 nm tall and about 400 nm wide.

The pixel waveguide 132 is evanescently coupled to a corresponding row bus waveguide 120 via a row-to-pixel directional coupler 150. Like the column-to-row directional couplers 140 shown in FIG. 1B, the row-to-pixel directional coupler 150 is formed by a coupling region 124 in the row bus waveguide 120 that runs parallel to and spaced apart from a coupling region 134 in the pixel waveguide 138. And like the column-to-row directional couplers 140, the row-to-pixel directional coupler 150 has a length (and/or width) that is selected to couple a predetermined percentage of the optical power from the row bus waveguide 120 into the pixel waveguide 132. This coupling efficiency may be different for each pixel, e.g., to ensure that each pixel radiates approximately the same amount of energy, to provide a predetermined envelope to the near-field radiation pattern emitted by the optical phased array 100, etc. In other embodiments, the row-to-pixel directional coupler 150 may include an active device that can be used to vary the amount of optical power coupled into (and out of) the pixel 130.

The pixel waveguide 132 couples light into an antenna element 138 (also known as a nanoantenna, nanophotonic antenna, or element) via an S-shaped static optical delay line 136. The static optical delay line 136 is formed of a section of the pixel waveguide 132 whose optical path length is selected to shift the phase of wave propagating through the pixel waveguide 132 by a predetermined amount $\phi_{mn}$. In this case, the static optical delay line 136 includes two sections, each of which induces a phase shift $\phi_{mn}/2$, where m and n are the pixel's row and column indices, for a total phase shift $\phi_{mn}$. In other embodiments, the pixel may include an optical delay line more or fewer segments, each of which induces an appropriately selected phase shift (e.g., $\phi_{mn}/4$ and $3\phi_{mn}/4$, $\phi_{mn}/3$ and $2\phi_{mn}/3$, etc.).

As shown in FIG. 1D, using a curved or serpentine delay line 136 reduces the pixel's size, which in turn allows for a finer pixel pitch. In addition, the delay line design makes the position of the antenna element 138 independent of the phase delay $\phi_{mn}$, so that all of the antenna elements 138 can be placed on a periodic grid. The varied coupler length slightly affects the phases of the transmitted light and the coupled-out light. This effect can be accounted for when calculating the phase shift $\phi_{mn}$ for each pixel 130.

The antenna element 138 shown in FIG. 1D is a dielectric grating formed in the same plane as the column bus waveguide 110, the row bus waveguides 120, and the pixel waveguide 132. The grating diffracts light up and down, out of the plane of the waveguides and the grating. Because the grating has a relatively small number (e.g., 5) of rulings, its may have a diffraction bandwidth with a full-width half-maximum of hundreds of nanometers (e.g., 100 nm, 200 nm, etc.). In some cases, the grating may be blazed to diffract more light up than down (or vice versa). In addition, the grating period may be slightly detuned from resonant emission to avoid reflecting radiation back into the pixel waveguide 132, where it could be produce undesired interference. This detuning may shift the optical axis of the emitted beam away from the surface normal of the grating.

Active Optical Phased Arrays

Figure 2A:
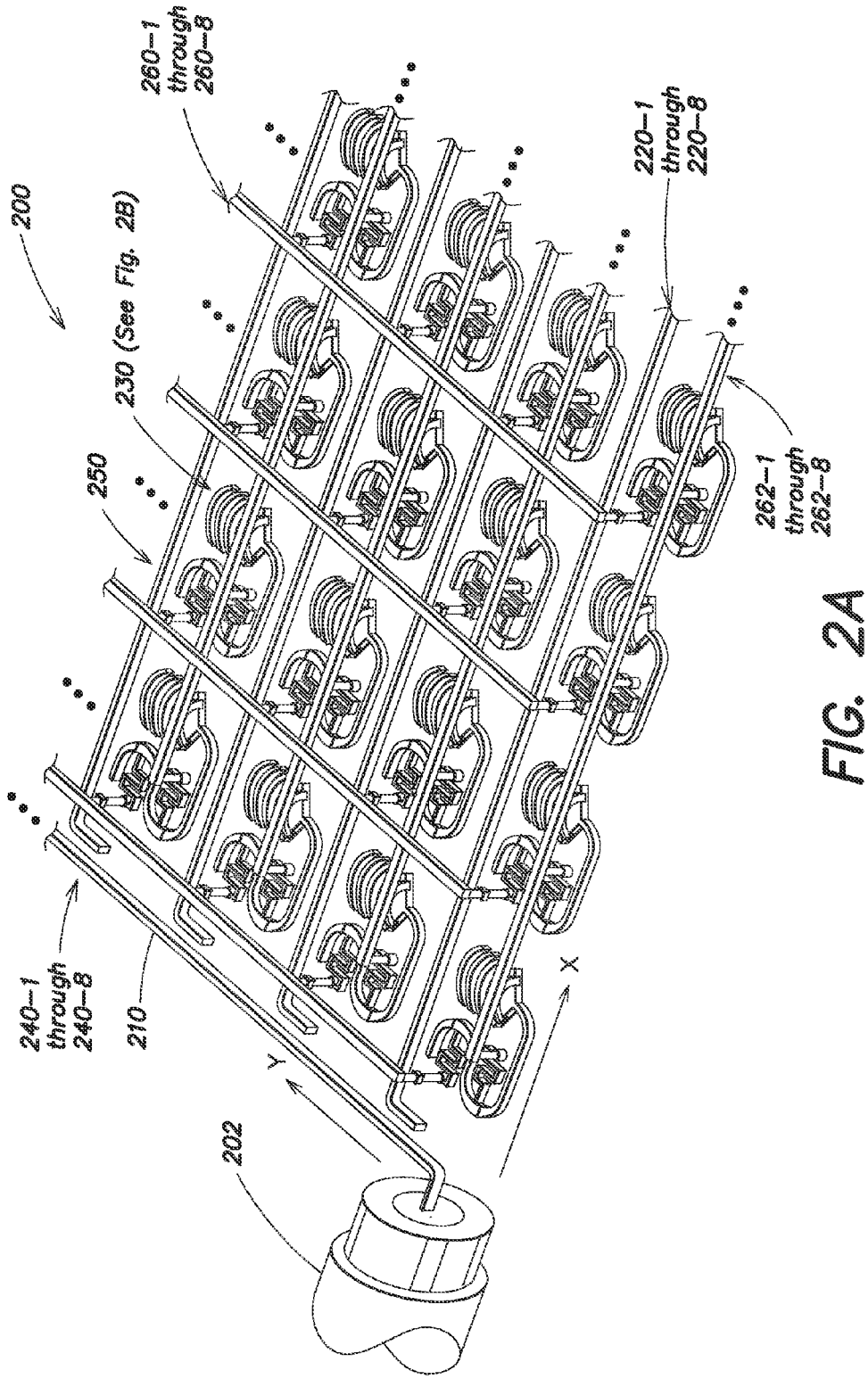
FIG. 2A is a schematic illustration of an 8×8 element active optical phased array that uses thermo-optic phase tuning.
Figure 2B:
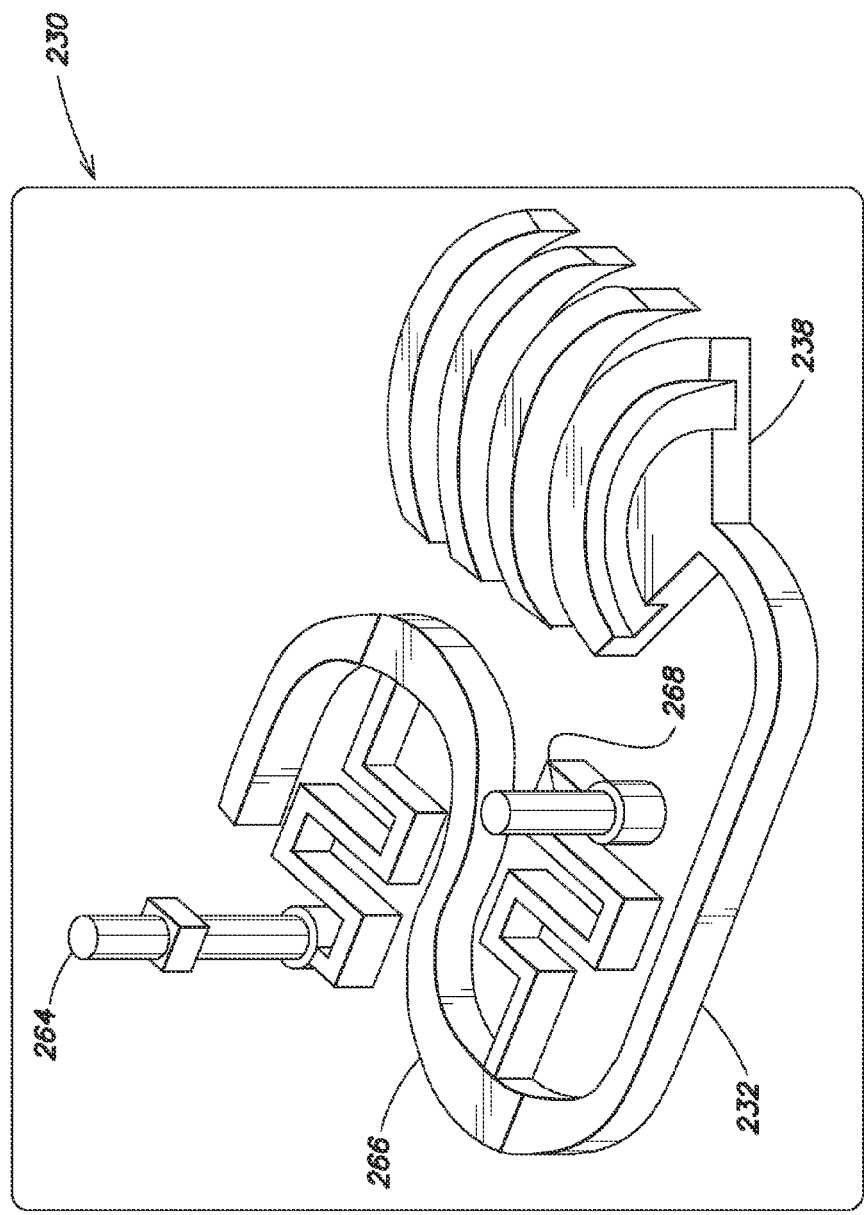
FIG. 2B is a schematic illustration of an thermo-optically tuned pixel in the active optical phased array of FIG. 2A.

FIGS. 2A and 2B illustrate an 8×8 actively tunable optical phased array 200 and a unit cell (pixel) 230, respectively. Like the passive phased array 100 shown in FIG. 1A, the active phased array 200 shown in FIG. 2A includes a source of optical radiation—in this case, an optical fiber 202 coupled to a laser (not shown)—that launches an optical beam with a free-space wavelength $\lambda_0$ into a single-mode column bus waveguide 210. Evanescent directional couplers 240-1 through 240-8 (collectively, directional couplers 240) like those described with respect to FIG. 1B couple light from the column bus waveguide 210 into eight different row bus waveguides 220-1 through 220-8 (collectively, row bus waveguides 220). And as described above, the directional couplers' coupling efficiencies may vary so as to ensure that each row bus waveguide receives a predetermined amount (e.g., an equal amount) of optical power from the column bus waveguide 210.

Each row bus waveguide 220 guides an optical beam from the corresponding directional coupler 240 to eight unit cells (pixels) 230, each of which can be on the order of $\lambda_0$ (e.g., about 9 μm×9 μm). As described above with respect to FIG. 1D, directional couplers 250 evanescently couple light from the row bus waveguide 220 to corresponding unit cells 230, each of which includes a silicon waveguide 232 that couples light into a grating-based antenna element 238. This antenna element 238 emits the light with a desired amplitude and phase to form a pattern in the far field of the active optical phased array 200.

In this case, however, the active optical phased array 200 includes a pixel addressing matrix that can be used to independently vary the phases of the beams emitted by the pixels 230. The pixel addressing matrix is formed of column control wires 260-1 through 260-8 (collectively, column control wires 260) and row control wires 262-1 through 262-8 (collectively, row control wires 262). In this example, the column control wires 260 and row control wires 262 are disposed in parallel planes above the pixels 230; in other examples, the control wires may be routed in planes below the pixels 230 instead.

As shown in FIGS. 2A and 2B, each column control wire 260 runs above a corresponding column of pixels 230 and is electrically coupled to a copper-silicon electrical contact 264 in each of the pixels 230 in the column. Similarly, each row control 262 runs above a corresponding row of pixels 230 and is electrically coupled to a copper-silicon electrical contact 268 in each pixel 230 in the row. The electrical contacts 264 and 268 in each pixel 230 are electrically coupled to a corresponding integrated heater 266 formed by doping a portion of the silicon waveguide 232. Each heater 266 may have a resistance of about 2.5 kΩ, including the resistance of the contacts 264 and 268.

Applying a voltage to a particular column control wire 260-m and a particular row control wire 262-n causes a change in the electrical potential across the integrated heater 266 in the pixel 230-mn at the intersection of the column control wire 260-m and the row control wire 262-n. This potential change causes the heater 266 to change temperature (get hotter or colder), leading to a corresponding change in the optical path length of the doped portion of the silicon waveguide 232 via the thermo-optic effect. And this change in optical path length induces a corresponding phase shift in the optical beam propagating through the waveguide 232 to the antenna element 238. In some cases, the heater 266 may operate with a thermal efficiency of about 8.5 mW per 7° of phase shift.

Figure 3A:
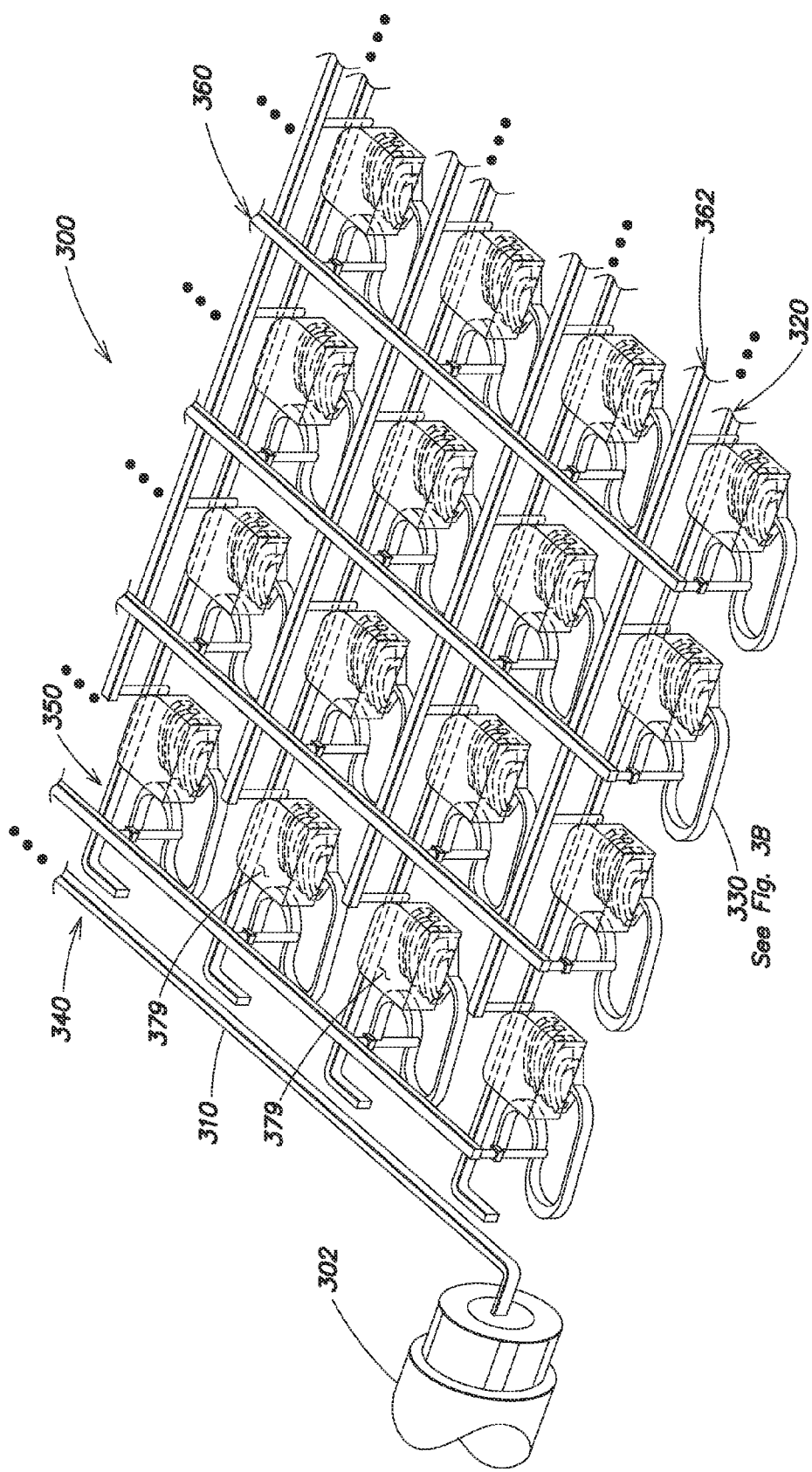
FIG. 3A is a schematic illustration of a 12×12 element active optical phased array that uses liquid-based phase tuning.
Figure 3B:
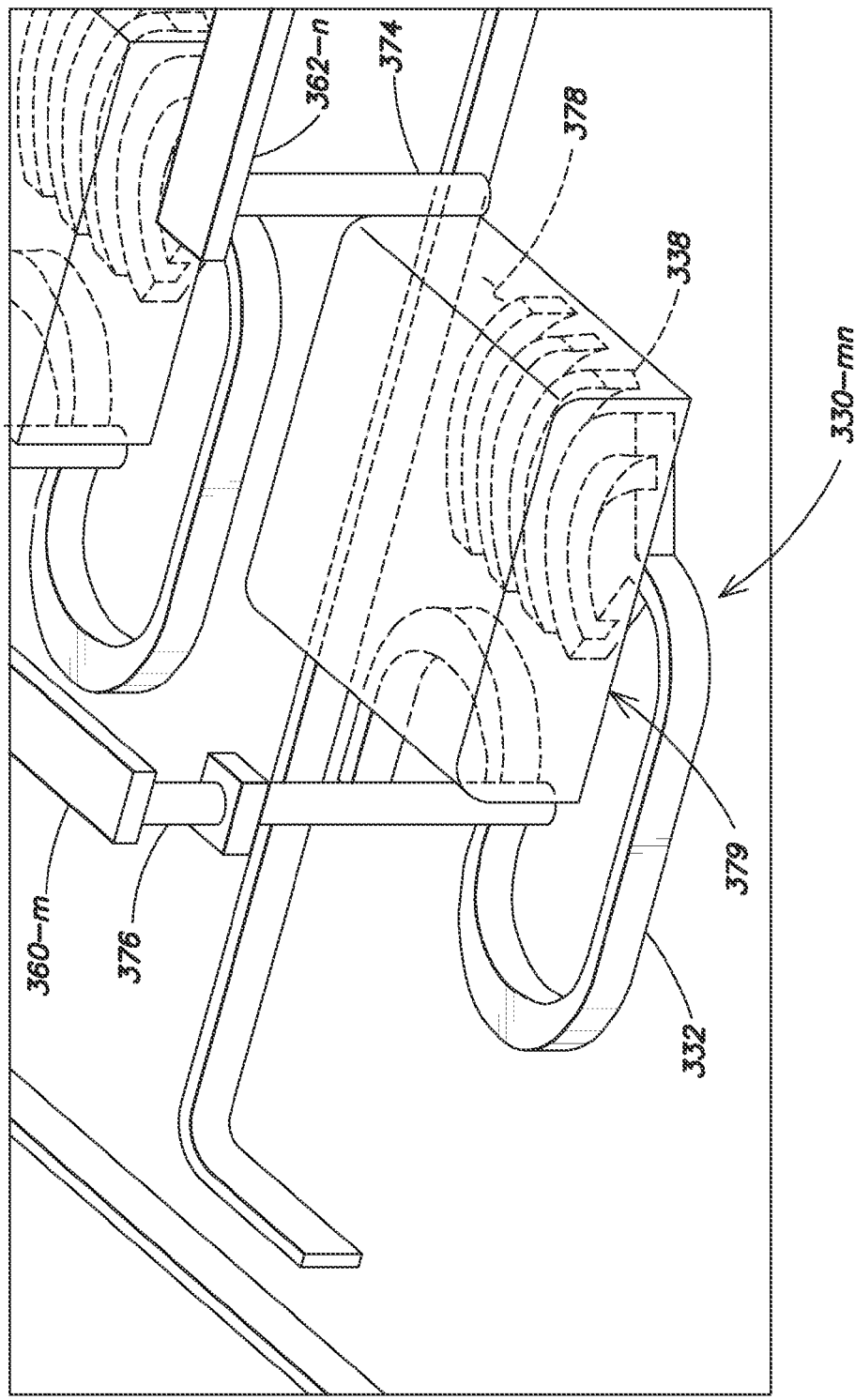
FIG. 3B is a schematic illustration of an liquid-tuned pixel in the active optical phased array of FIG. 3A.

FIGS. 3A and 3B illustrate an active optical phased array 300 that uses liquid-based tuning instead of (or in addition) to integrated heaters for varying the phases of the beams emitted by the pixels. Again, an optical fiber 302 coupled to a laser (not shown) launches an optical beam with a free-space wavelength $\lambda_0$ into a single-mode column bus waveguide 310. Evanescent directional couplers 340 couple light from the column bus waveguide 310 into row bus waveguides 320 with coupling efficiencies selected to ensure that each row bus waveguide 320 receives a predetermined amount (e.g., an equal amount) of optical power from the column bus waveguide 310. Each row bus waveguide 320 guides an optical beam from the corresponding directional coupler 340 to a corresponding set of unit cells (pixels) 330, each of which can be on the order of $\lambda_0$ (e.g., about 9 μm×9 μm). Directional couplers 350 evanescently couple light from the row bus waveguide 320 to corresponding unit cells 330, each of which includes a silicon waveguide 332 that couples light into a grating-based antenna element 338 as shown in FIG. 3B. This antenna element 338 emits the light with a desired amplitude and phase to form a pattern in the far field of the active optical phased array 300.

Like the active optical phased array 200 shown in FIG. 2A, the active optical phased array 300 shown in FIG. 3A includes column control wires 360 and row control wires 362 in parallel planes above the plane of the pixels 330. These column control wires 360 and row control wires 362 are connected to electrical contacts 374 and 376 in the individual pixels 330 as shown in FIG. 3B, much like the control wires shown in FIGS. 2A and 2B.

The active optical phased array 300 illustrated in FIGS. 3A and 3B also includes an array of fluid reservoirs 379 disposed above the unit cells 330. In this cases, there is one liquid reservoir 379 for each pixel 330; in other cases, a single reservoir may cover multiple pixels. Each fluid reservoir 379 holds a corresponding volume of fluid 378, such as an electro-active material or transparent fluid with a refractive index greater than that of air (e.g., n=1.5). In this example, the fluid comprises electro-active liquid crystal material 378 that is transparent at the phased array's emission wavelength $\lambda_0$.

Applying a voltage to a particular column control wire 360-m and a particular row control wire 362-n yields a potential drop across the liquid crystal material 378 and fluid reservoir 379-mn in the pixel 330-mn at the intersection of the column control wire 360-m and the row control wire 362-n. This liquid crystal material 378 aligns itself with the direction of the applied electric field, causing a change in the refractive index experienced by light propagating from the antenna element 338 through the liquid crystal material 378. This increase or decrease in the liquid crystal's refractive index retards or advances the phase of the emitted beam.

Alternatively, or in addition, the liquid crystal material may also rotate the polarization of the emitted beam. In some cases, the emitted beam may then pass through a fixed polarizer (e.g., a linearly polarizing film; not shown); if the emitted beam's polarization state does not match the polarization state passed by the polarizer, the polarizer attenuates emitted beam as understood by those skilled in the art. Thus, the emitted beam can be selectively attenuated by actuating the liquid crystal material to tune the emitted beam's polarization state. In other cases, the polarizer may be omitted, and the liquid crystal material may modulate the polarization of the emitted beam, e.g., to produce polarization-multiplexed patterns in the far field and/or to change the polarization of the far-field pattern.

In other examples, the phased array may include one or more auxiliary reservoirs that are coupled to the fluid reservoirs via microfluidic channels and/or microfluidic pumps (not shown). These pumps can be used to increase or decrease the amount of fluid in a particular fluid reservoir so as to produce a corresponding increase or decrease in the optical path length experienced by the beam emitted by the antenna element under the fluid reservoir. In other words, the fluid-filled reservoirs may act as variable optical delay lines for tuning the phase(s) of the emitted beam(s).

As readily appreciated by those of skill in the art, applying an appropriate combination of voltages to the column control wires and row control wires shown in FIGS. 2A and 3A tunes the phases of the beams emitted by the pixels in phased array. The voltages may be determined by a processor (not shown) in order to project a particular image or pattern of radiation into the far field of the phased array. For instance, applying a voltage ramp via the row electrodes across one face of the optical phase array causes the beam to point up or down, depending on the slope of the voltage ramp.

Optical Phased Arrays for Arbitrary Pattern Generation

The ability to integrate a large number of pixels in a nanophotonic phased array within a small footprint opens up the possibility of using the nanophotonic phased array to generate arbitrary, sophisticated far-field radiation patterns. The far-field radiation field $E(\theta,\phi)$ of the phased array is calculated as the far field of an individual nanoantenna $S(\theta,\phi)$ multiplied by the array factor $F_a(\theta,\phi)$, which is a system factor that is related to the phase of optical emission from all the pixels:

$$E(\theta,\phi)=S(\theta,\phi)\times F_a S(\theta,\phi) \qquad (1)$$

In principle, arbitrary radiation patterns can be produced in the far field with large-scale nanophotonic phased arrays by controlling the emitted phases of all the pixels. Given the short optical wavelength (1.55 μm) and the high refractive index of silicon (n≈3.48), however, slight fabrication imperfections may cause significant phase errors. As a consequence, a nanophotonic phased array should be resistant to phase errors in order to be fabricated reliably and to function properly.

Fortunately, the large-scale nanophotonic phased arrays disclosed herein are highly tolerant of phase errors (e.g., as described below with respect to FIGS. 7A-7D). This high phase-error tolerance originates from the nanophotonic phased array's nature as a Fourier system, in which the phase noise of the near-field emission averages out in the far field through interference of optical emissions from all of the pixels. This high phase-error tolerance becomes more effective with more pixels and enables nanophotonic phased arrays to scale up to hundreds, thousands, or millions of pixels.

FIGS. 4A-4D illustrate simulations of an optical phase array like those shown in FIGS. 1A, 2A, and 3A. The pixel pitch of the nanophotonic array is chosen to be 9 μm in both the x and y directions, as used in fabrication, and the free-space wavelength is taken to be about 1.55 μm. Because the pixel pitch is a multiple of the free-space half-wavelength, the interference conditions occur periodically in the far field to produce higher-order patterns, which appear as replicas of the desired radiation pattern (an "MIT" logo).

Figure 4B:
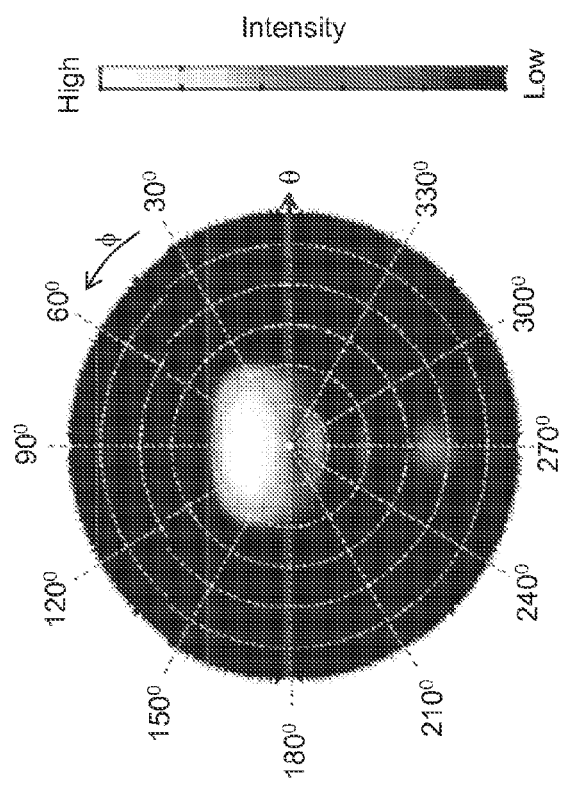
FIG. 4B is a polar plot of the far-field radiation pattern of the optical nanoantenna, calculated from the near-field emission plotted in FIG. 4A, using the near-to-far-field transformation.
Figure 4A:
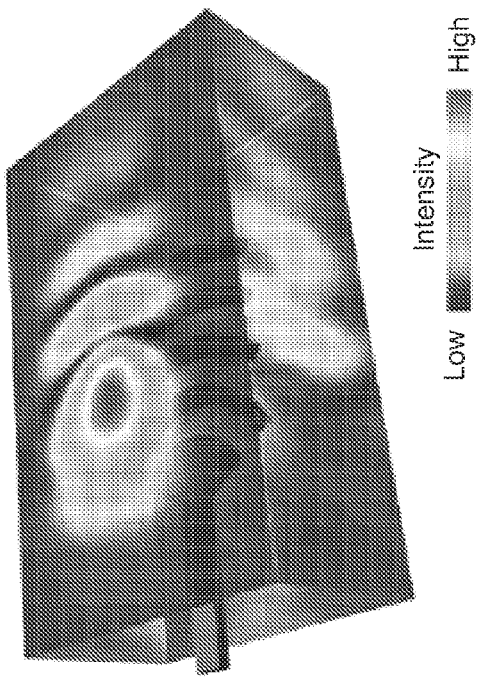
FIG. 4A is a plot of a finite-difference time-domain (FDTD) simulation of the three-dimensional, near-field emission of a nanophotonic antenna suitable for use in an optical phased array.

FIG. 4A shows a near-field emission pattern, simulated using three-dimensional finite-difference time-domain methods, from a grating antenna element that emits 51% of the optical power upwards and 30% downwards at a wavelength of 1.55 μm. The emission is not vertical (normal to the surface) because the grating period is slightly detuned from the period of a second-order grating that would emit vertically. This detuning suppresses resonant back-reflections that might otherwise interfere with the light propagating in the phased array. The emission from the nanoantenna is also broadband, with a full-width bandwidth extending across hundreds of nanometers (e.g., more than 100 nm) in wavelength.

Figure 4D:
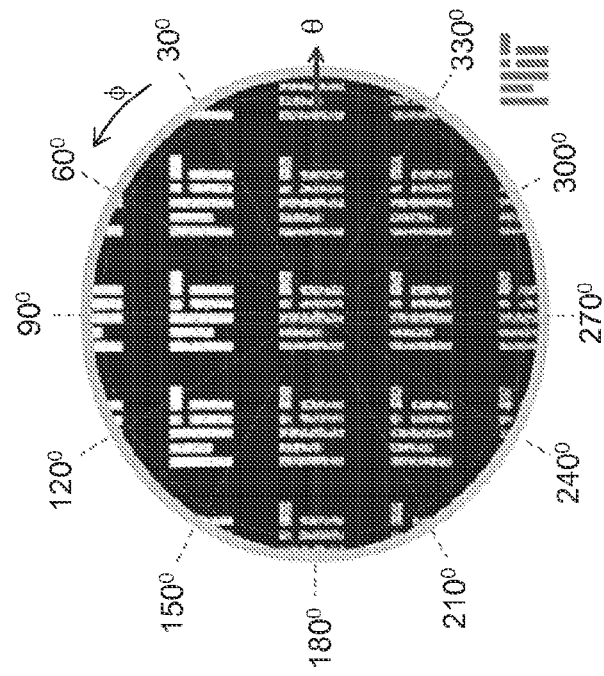
FIG. 4D is a polar plot of the circled area of the simulated radiation pattern shown in FIG. 4C.
Figure 4C:
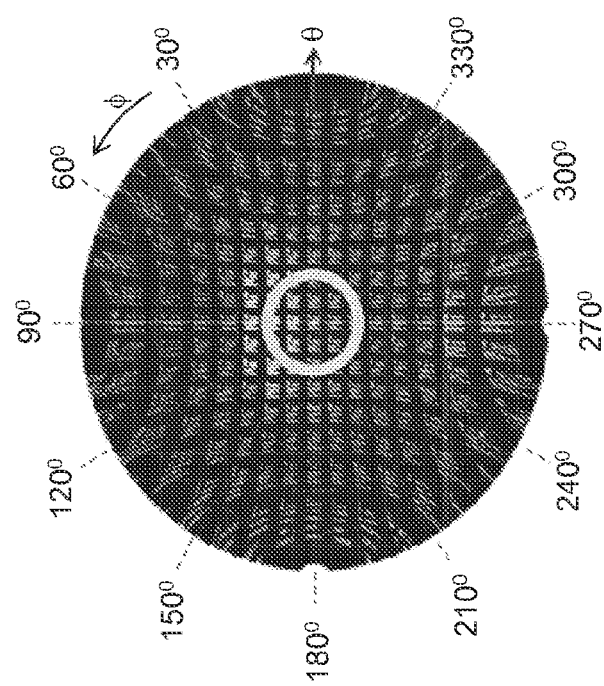
FIG. 4C is a polar plot of a simulated radiation pattern (here, showing the logo of the Massachusetts Institute of Technology (MIT)) emitted by the 64×64 element optical phased array shown in FIG. 2A in the far field.

FIGS. 4B-4D show simulated far-field patterns of the optical nanoantenna shown in FIG. 4A (FIG. 4B) and arrays of the optical nanoantenna shown in FIG. 4A calculated using the near-to-far-field transformation. These far-field patterns appear as projections of the far-field hemisphere to the equatorial plane in a polar coordinate system. They are viewed from the zenith of the far-field hemisphere, where θ and ϕ are the far-field azimuth angle and polar angle, respectively. In each case, the projected pattern is visible mainly in the vicinity of the zenith due to the directional emission of the optical nanoantenna. Varying or assigning a particular optical phase $\phi_{mn}$ of each pixel (where m and n are the pixel's row and column indices, respectively) in the nanophotonic phased array makes it possible to project a predetermined radiation pattern $E(\theta,\phi)$. The phase $\phi_{mn}$ of each pixel can be determined by antenna synthesis, e.g. using the Gerchberg-Saxton algorithm as described below with respect to FIG. 5.

FIGS. 4C and 4D show simulations of the radiation pattern of a 64×64 nanophotonic phased array designed to generate the MIT logo in the far field. This radiation pattern is a superposition of the far field of the system's array factor (as shown in the background) and that of the nanoantenna (in FIG. 4A). The circle in the center of FIG. 4C indicates the viewable region in a microscope lens (e.g., with a numerical aperture of 0.4) as also shown in FIGS. 10E and 10F (described below). FIG. 4D shows a close-up view of the viewable region of the far field displaying the MIT logo. The inset on the lower right shows the MIT logo pattern.

Synthesis of a Large-Scale Nanophotonic Phased Array

Nanophotonic phased array synthesis yields a specific far-field radiation pattern by assigning the optical phase of each pixel in the phased array. As shown in Equation (1) above, the far-field radiation pattern is the multiplication of the far field of an individual nanoantenna $S(\theta,\phi)$ and that of the array factor $F_a(\theta,\phi)$. While the far field of an individual nanoantenna is fixed, the array factor $F_a(\theta,\phi)$ is related to the emitting phase of all the pixels in the array:

$$F_a(\theta,\phi) = \sum_{m=1}^{M}\sum_{n=1}^{N} w_{mn}\cdot e^{j2\pi(x_m u + y_n v)} = \mathscr{F}(w_{mn}) = \mathscr{F}(e^{j\phi_{mn}}) \qquad (2)$$

where M×N is the size of the array and $(X_m, Y_n)$ describes the position of each nanoantenna. The emitting amplitude and phase of the nanoantenna are described by $|W_{mn}|$ and $\phi_{mn}$, respectively, so that $W_{mn}=|W_{mn}|\exp(i\phi_{mn})|$.

In a phased array, the nanoantennas may emit with a desired amplitude pattern, such as the uniform amplitude used here ($|W_{mn}|=1$), to create an ideal interference condition in the far field for the phase ($\phi_{mn}$) interaction to take effect properly. The parameters $u=\sin(\theta)\cos(\phi)/\lambda_0$ and $v=\sin(\theta)\sin(\phi)/\lambda_0$ are related to the far-field coordinates $(\theta,\phi)$, and $\lambda_0$ is the optical wavelength in free space. As shown in Equation (2), the array factor $F_a(\theta,\phi)$ is a simple discrete Fourier transform of the emitted phase of the array.

Figure 5:
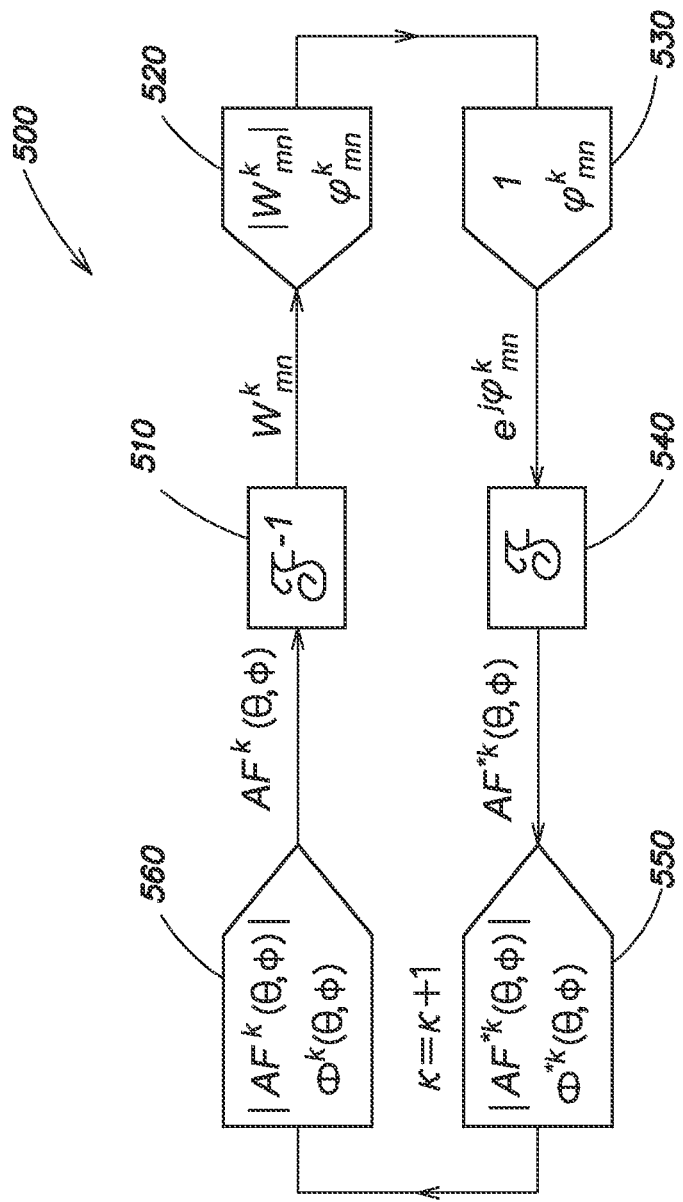
FIG. 5 is a block diagram that illustrates antenna synthesis for a large-scale nanophotonic phased array.

FIG. 5 is a block diagram that illustrates an efficient iterative process 500 for finding the optical phase $v_{mn}$ to generate a given radiation pattern $F_a(\theta,\phi)$ using the Gerchberg-Saxton algorithm. At the $k^{th}$ iteration, an approximated array factor $F_a^k(\theta,\phi)$, which includes the desired amplitude $|F_a(\theta,\phi)|$ and a trial phase $\phi^k(\theta,\phi)$, is inversely Fourier-transformed (block 510) to get the corresponding $w^k_{mn}$ of each nanoantenna. The far-field trial phase $\phi^k(\theta,\phi)$ can be chosen arbitrarily since it does not necessarily affect the final far-field radiation image (block 520). In block 530, the pixel amplitude of $w^k_{mn}$ is then set to 1, without changing the phase, to keep the amplitude of the nanoantennas' emission uniform across the array. Therefore the updated array factor $F_a^*(\theta,\phi)$ is obtained through a Fourier transform (block 540) whose phase $\Phi^{*k}(\theta,\phi)$ is passed to the $(k+1)^{th}$ iteration as the new trial phase $\Phi^{k+1}(\theta,\phi)$ (block 550). The initial trial phase of the radiation field is set to $\Phi^1(\theta,\phi)=0$ or another arbitrary value in the first iteration. After several iterations, the final array factor $F_a^{*k}(\theta,\phi)$ generated by the phase $\exp(i\phi_{mn})$ converges to the desired pattern $|F_a(\theta,\phi)|$.

Figures 6A, 6B:
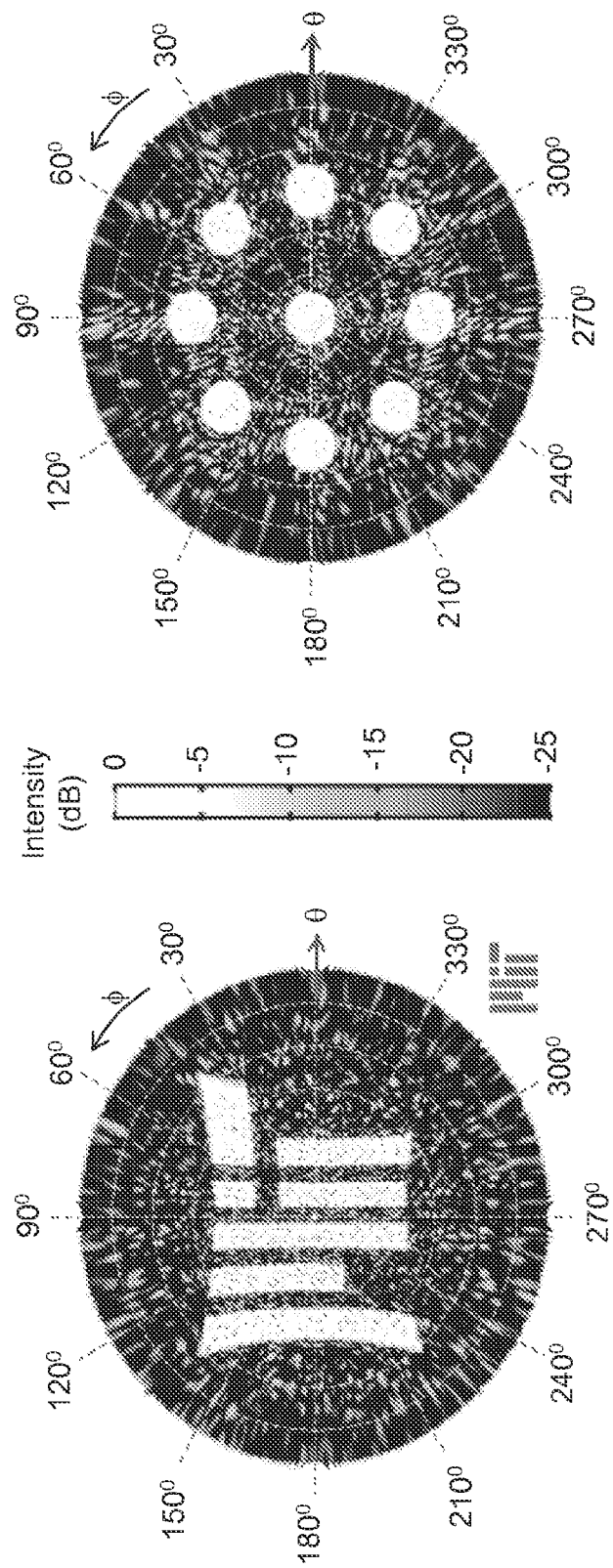
FIG. 6A shows a simulated far-field array factor pattern—in this case, the "MIT" logo—emitted by a 64×64 optical phased array with a pixel pitch of $\lambda_0/2$.
FIG. 6B shows a simulated far-field array factor pattern emitted by a 64×64 optical phased array with a pixel pitch of $\lambda_0/2$ for multiple beams propagating at different angles, e.g., for optical free space communications.
Figure 6C:
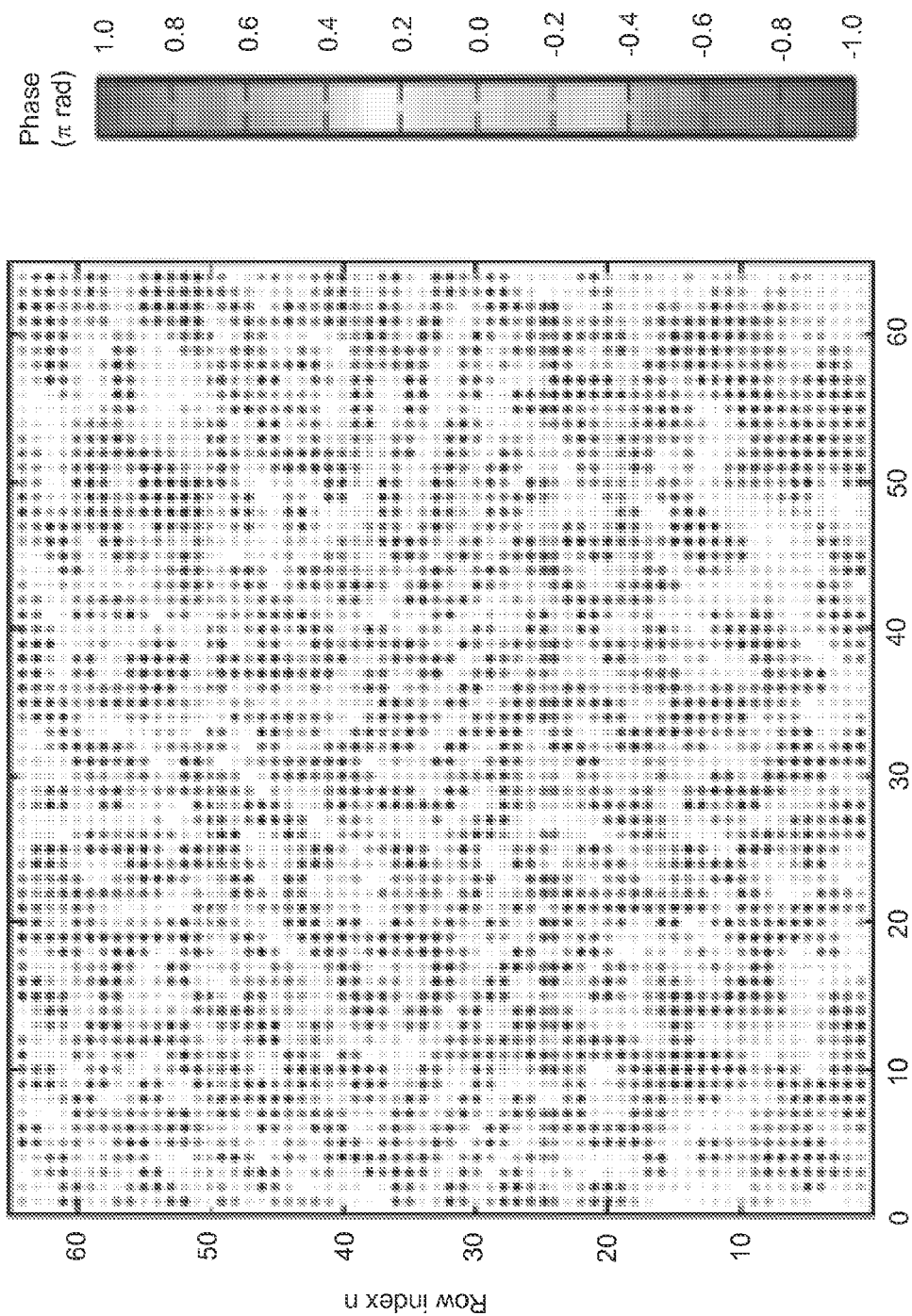
FIG. 6C is a color plot of the phase distribution across the 64×64 optical phased array used to generate the far-field array factor pattern shown in FIG. 6A.
Figure 6D:
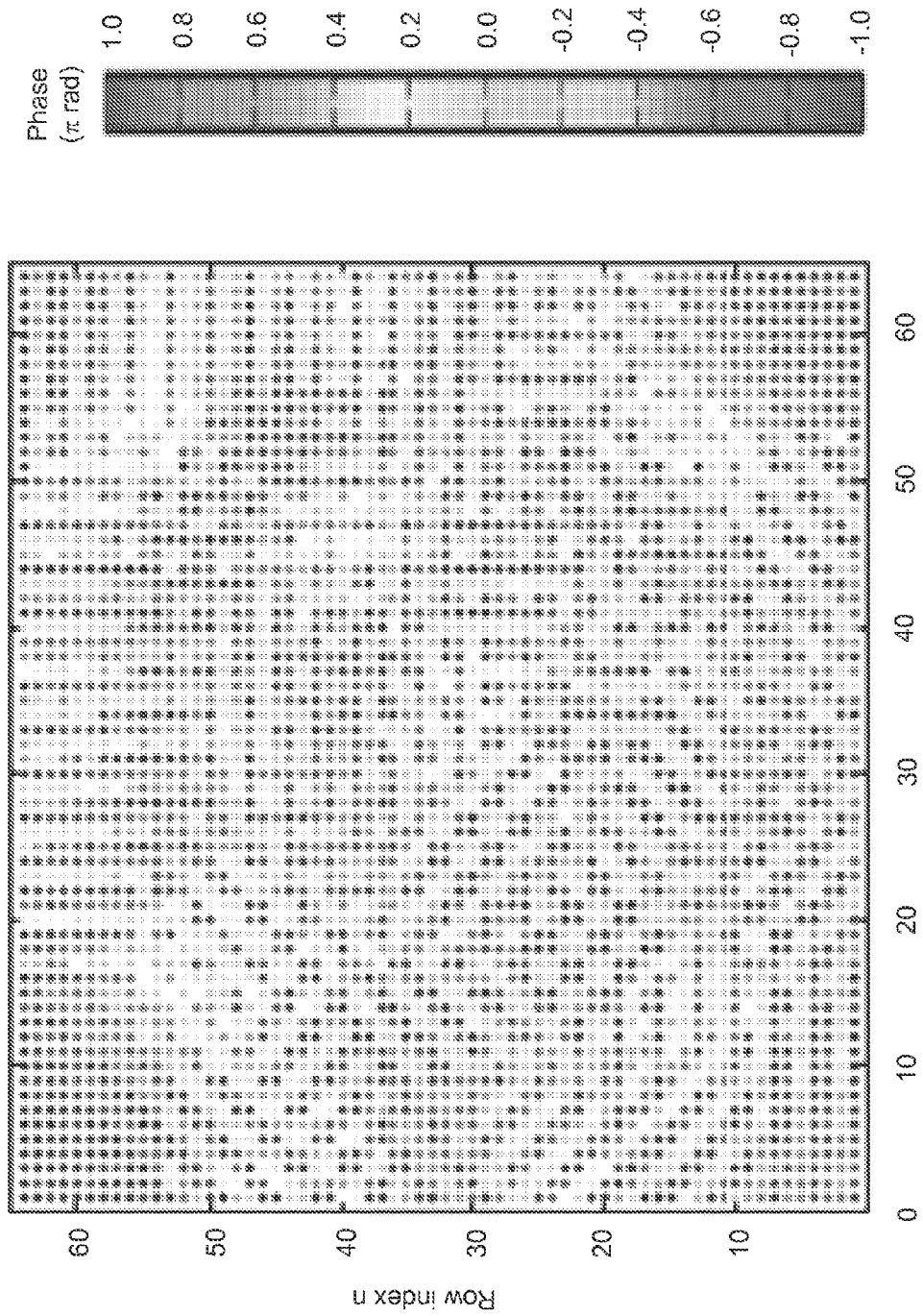
FIG. 6D is a color plot of the phase distribution across the 64×64 optical phased array used to generate the far-field array factor pattern shown in FIG. 6B.

FIGS. 6A-6D show simulations of a 64×64 nanophotonic phased array with a pixel pitch of $\lambda_0/2$ that used to produce a pattern in the far field with phases generated using antenna synthesis. FIG. 6A shows the "MIT" logo as projected in the far field, and FIG. 6C shows the corresponding phase distribution across the face of the array. Similarly, FIG. 6B shows multiple beams with different angles in the far field, with the corresponding phase distribution shown in FIG. 6D. As appreciated by those of skill in the art, projecting multiple beams at different angles can be useful in optical free space communications.

Phase Noise Analysis of Large-Scale Nanophotonic Phased Array

In a nanophotonic phased array, far-field generation relies on the precise optical phase $\phi_{mn}$ of each nanoantenna. However, due to random fabrication imperfections, the actual phase at each nanoantenna may differs from its desired value $\phi_{mn}$. This random error can be represented as a phase noise $\in_{mn}$ whose impact on the array factor pattern is to be analyzed. Assuming the random phase noise has a Gaussian probability distribution with zero mean $\langle \in_{mn}\rangle=0$ and standard deviation $\sigma$, which is usually the case for noise introduced by fabrication. The actual resulting array factor pattern in the presence of phase noise is again given by Equation (2), with the phase $$F_a^{ac}(\theta,\phi)=\langle \mathcal{F}(e^{j\in_{mn}}e^{j\phi_{mn}})\rangle=\langle \mathcal{F}(e^{j\in_{mn}})\rangle \otimes F_a^{id}(\theta,\phi) \quad (3)$$

where $F_a^{ac}(\theta,\phi)$ stands for the actual array factor pattern with noise, $F_a^{id}(\theta,\phi)$ is the ideal array factor pattern, and $\otimes$ is the convolution operator. The expectation value (denoted by the angle brackets) is used here, meaning that the average value is taken for the stochastic variables and functions. The discrete Fourier transform of phase noise is given by $$\langle \mathcal{F}(e^{j\in_{mn}})\rangle = \sum_m \sum_n \langle e^{j\in_{mn}}\rangle \cdot e^{j(x_m u + y_n v)} \quad (4)$$

And the expectation value in Equation (4) is by definition calculated as $$\langle e^{j\in_{mn}}\rangle = \int_{-\infty}^{+\infty} e^{j\epsilon} \cdot \frac{1}{\sqrt{2\pi}\,\sigma} e^{-\frac{\epsilon^2}{2\sigma^2}} d\epsilon = e^{-\sigma^2/2} \quad (5)$$

Substituting Equation (5) into equation (4) and then into equation (3) yields $$F_a^{ac}(\theta,\phi)=e^{-\sigma^2/2} \cdot F_a^{ad}(\theta,\phi) \quad (6)$$

Equation (6) shows that the shape of the far-field array factor pattern is preserved while its amplitude is reduced by a factor of $\exp(-\sigma^2/2)$ due to the phase noise.

FIGS. 7A-7D show simulations of the far-field radiation patterns of an optical phased array affected by different levels of phase noise with a standard deviation $\sigma$. More specifically, the simulations show Gaussian phase noise at levels of $\sigma=0$ (no phase noise; FIG. 7A), $\sigma=\pi/16$ (FIG. 7B), $\sigma=\pi/8$ (FIG. 7C), and $\sigma=\pi/4$ (FIG. 7D) added to the outputs of a 64×64 nanophotonic phased array whose phases $\phi_{mn}$ are set to generate the MIT logo. These figures show that the shape of the desired pattern remains relatively unaffected by increasing phase noise, but that the signal-to-noise ratio (SNR) drops. The increase in background noise comes from the emitted beams' inability to completely meet the desired interference conditions in the presence of the phase noise. The simulation results are consistent with the theoretical analysis in Equation (6).

FIGS. 7A-7D show that even with relatively large phase noise ($\sigma=\pi/4$), the desired pattern is still distinguishable. This shows that the phased array exhibits high tolerance to phase errors, which relaxes accuracy requirements on fabrication, and suggests that a large-scale nanophotonic phased array can be produced reliably and function properly. Moreover, this high error tolerance does not depend on the scale of array. In fact, statistical considerations imply that the analysis above applies more precisely to an array with a larger number of nanoantennas. As a result, the nanophotonic phased array beyond 64×64 to millions of pixels.

EXEMPLIFICATION

The following example is intended to highlight aspects of the inventive subject matter without limitation of the claims.

Nanophotonic phased arrays were fabricated in a 300-mm CMOS foundry with a 65-nm technology node, using silicon-on-insulator wafers with a 0.22 μm top silicon layer and 2 μm buried oxide. A timed partial silicon etch (0.11 μm) was first performed to make the partly etched grating groove. A full silicon etch was then applied to form the waveguides and grating nanoantennas. Subsequent n and n+ dopings were implanted for active arrays, followed by standard silicidation to make copper-silicon contacts. The contacts were connected to on-chip probing pads by two metal layers for thermo-optic tuning $SiO_2$ with a total thickness of 3.6 μm was used to cover the devices, with a final polishing step to make the surface planar to avoid additional phase errors due to surface corrugation.

Figure 8A:
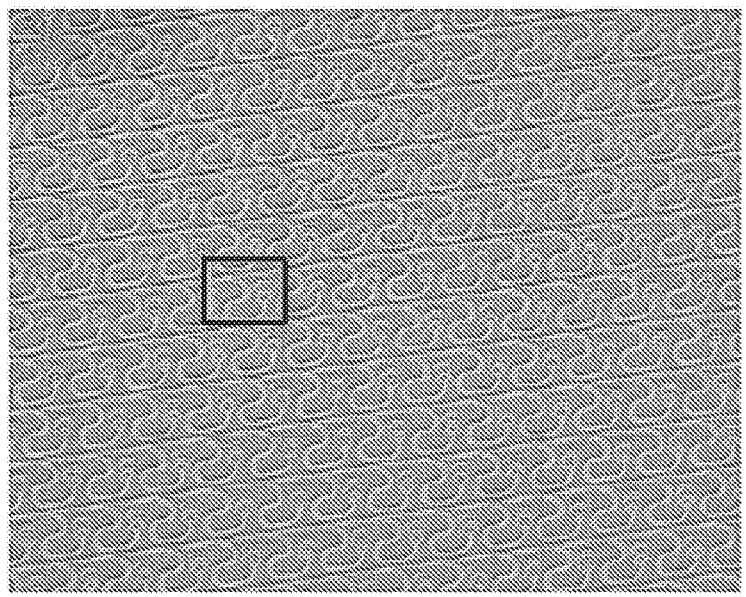
FIG. 8A is a scanning electron micrograph (SEM) of a fabricated 64×64 element optical phased array.
Figure 8B:
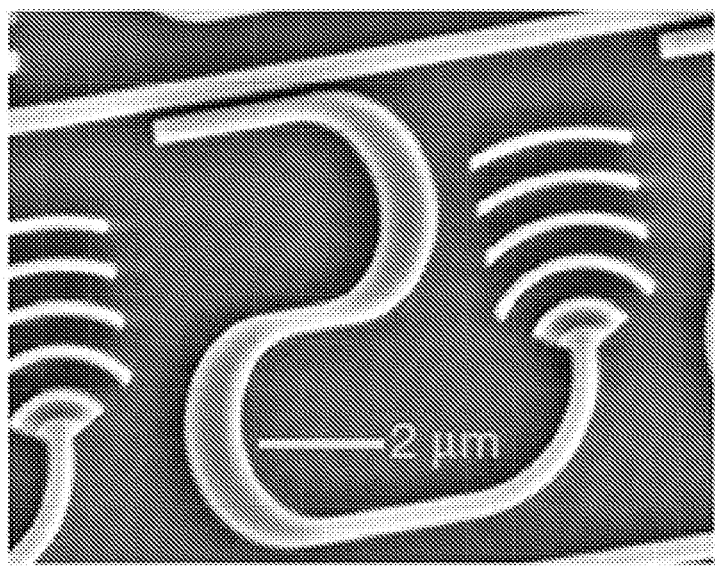
FIG. 8B is an SEM of a pixel in the fabricated 64×64 element optical phased array shown in FIG. 8A.

FIGS. 8A and 8B are scanning electron micrographs (SEMs) of part of a 64×64 nanophotonic phased array fabricated at a CMOS foundry. FIG. 8A shows several pixels in the nanophotonic phased array, and FIG. 8B is a close-up of the pixel indicated by the rectangle in FIG. 8A. The pixel size is 9 μm×9 μm, with a compact silicon dielectric grating as an optical nanoantenna, where the first groove of the grating is partly etched to enhance the upward emission. The emitted phase of each pixel can be adjusted by varying the optical path length of a optical delay line within the pixel.

Figure 9A:
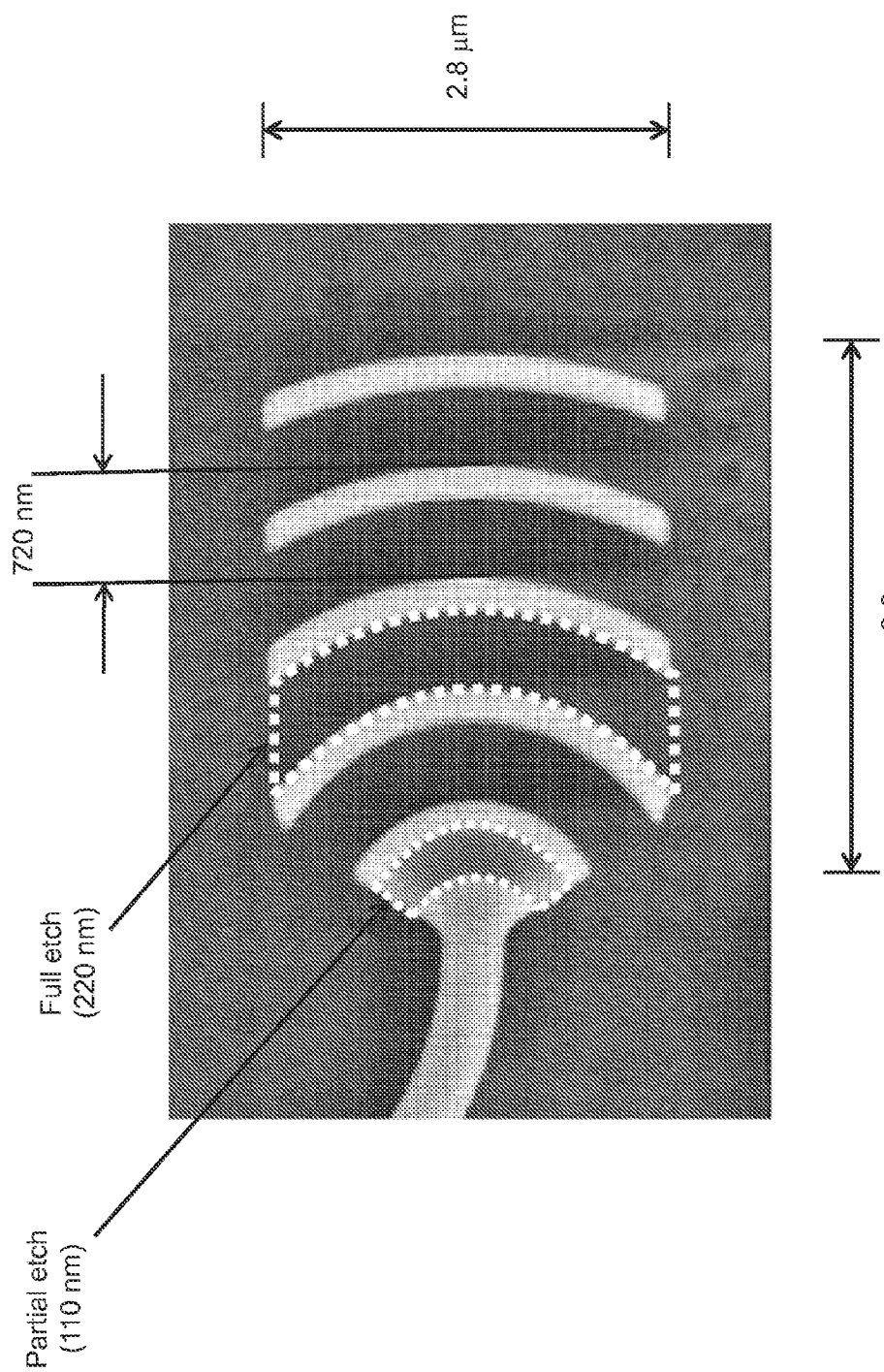
FIG. 9A is an SEM of a fabricated nanophotonic antenna suitable for use in an optical phased array.

FIG. 9A is a close up of the silicon dielectric nanoantenna in the pixel of FIG. 8B. The nanoantenna is used as an emitter in each pixel for direct integration with CMOS process. Lighter regions represent silicon with a height of 220 nm, darker regions represent the buried oxide (BOX) layer underneath the silicon, and the moderately shaded region represents partially etched silicon with a height of 110 nm. The nanoantenna measures 3.0 μm×2.8 μm and includes five grating etches. The first grating etch is halfway through the 220 nm-thick silicon layer to create an up-down asymmetry in order to emit more power up and out of the plane of the phased array. The grating period is 720 nm, which is slightly detuned from the period of a second-order grating (581 nm for Si—SiO$_2$ gratings at $\lambda_0$=1.55 μm). This detuning suppresses resonant back-reflections that could otherwise interfere with propagation of beam within the phased array. This detuning also causes the antenna to emit light along an axis angled with respect to the surface normal of the optical phased array.

Figure 9B:
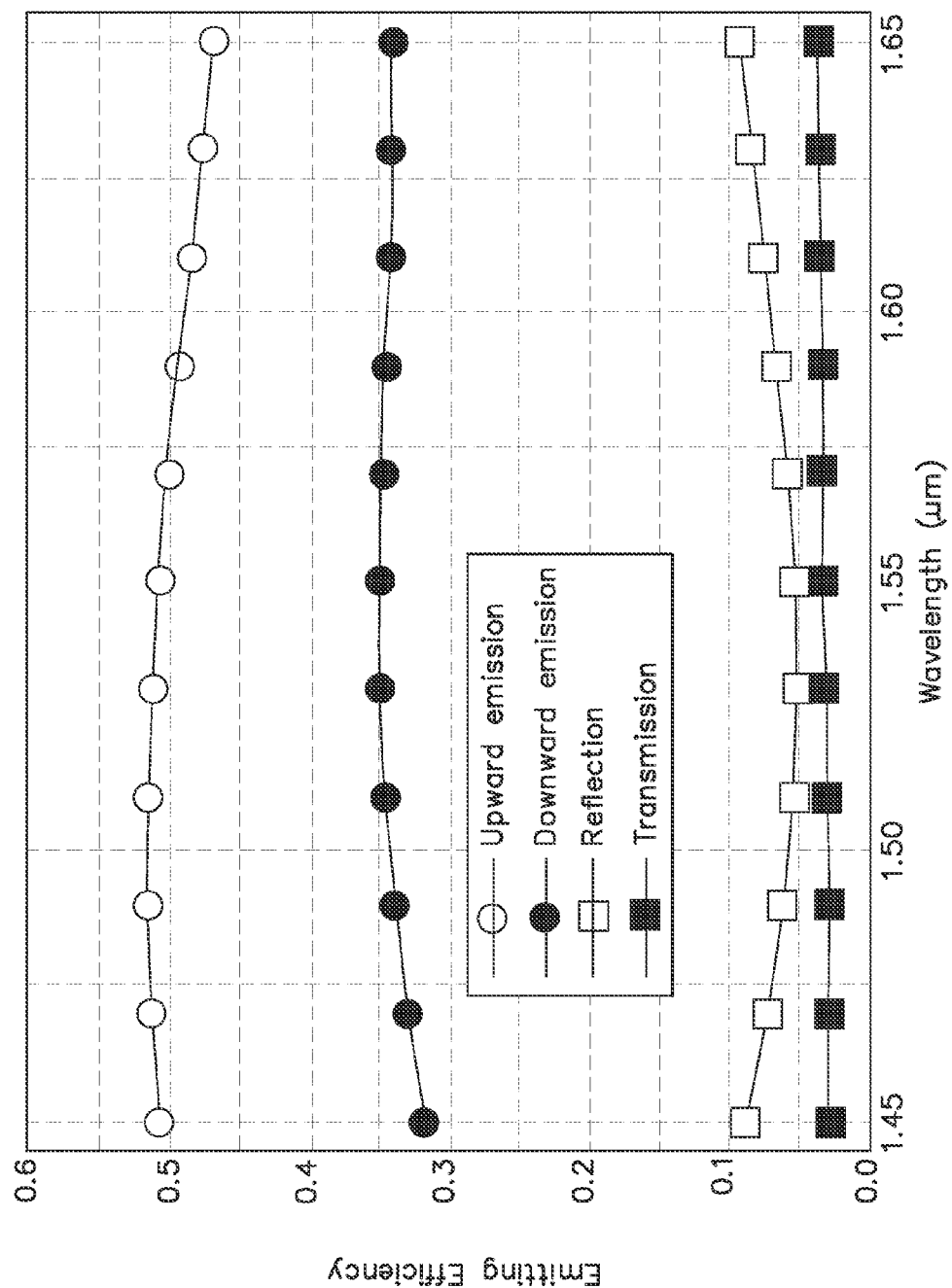
FIG. 9B is a plot of the simulated emission efficiency versus emission wavelength for the nanophotonic antenna of FIG. 9A in upward emission (top curve), downward emission (upper middle curve), reflection (lower middle curve), and transmission (bottom curve).

FIG. 9B is a plot of the emitting efficiency of the antenna shown in FIG. 9A. It shows a total emission efficiency of 86% is achieved at a wavelength of 1.55 μm with 51% emitting up and 35% emitting down. FIG. 9B also shows back-reflections of about only 5% at $\lambda_0$=1.55 μm and that the 3 dB bandwidth of the emission exceeds 200 nm due to the antenna's short grating length. More efficient up-emission can be realized by optimizing the partial etch depth (the partial etch depth was fixed to 110 nm in this case out of consideration for other devices on the same mask), by adding a reflective ground plane underneath the grating to reflect the downward emission, or both.

Figure 10A:
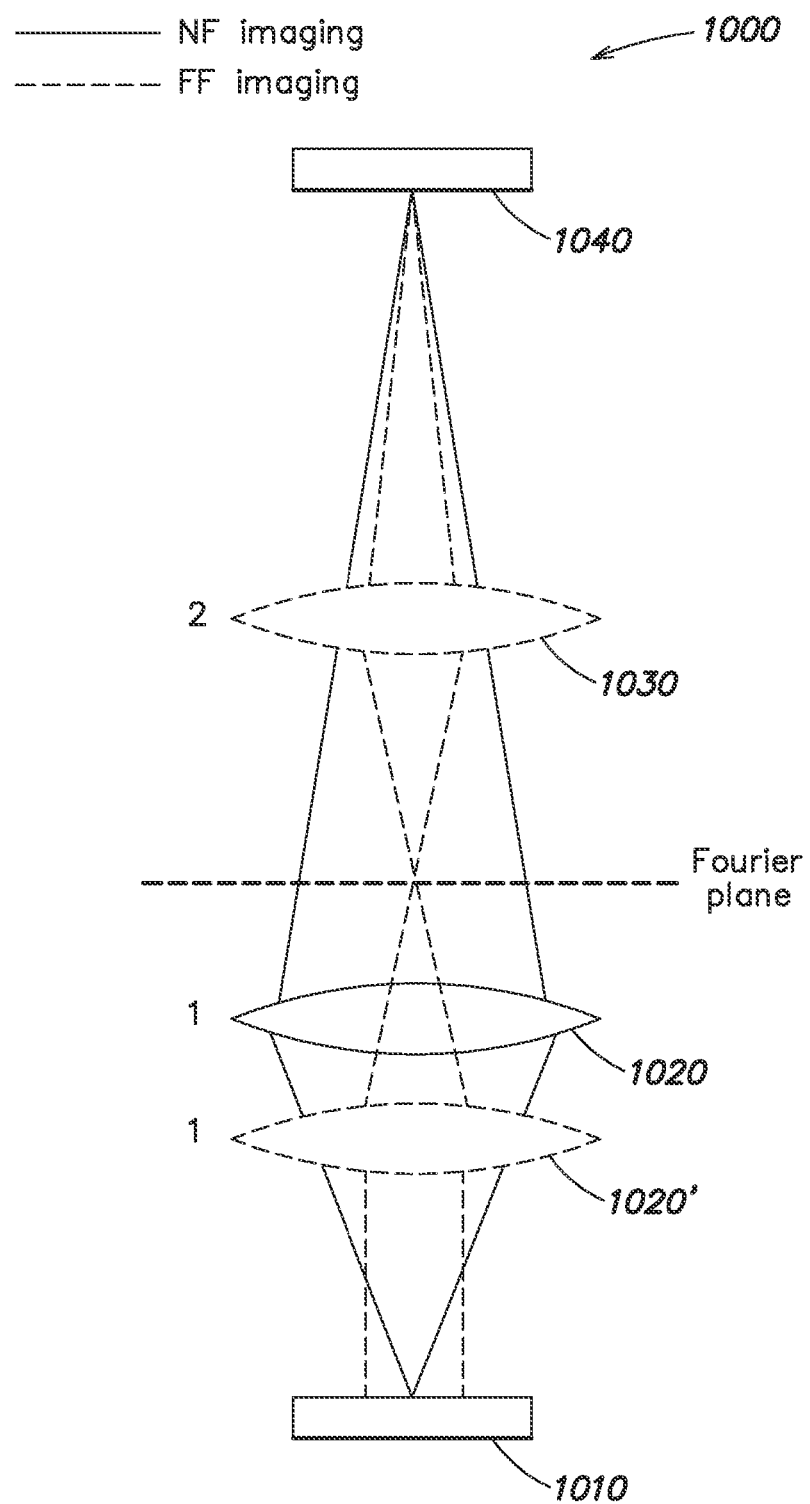
FIG. 10A is a diagram of an imaging system used to observe the near field and far field of an optical phased array.

FIG. 10A is a diagram of an imaging system 1000 used to observe the near field and far field of the nanophotonic phased array 1010 shown in FIGS. 8A, 8B, and 9A emitting light at a wavelength of 1.55 μm. A first lens 1020 alone (numerical aperture 0.40) was used to obtain a near-field (NF) image with an infrared charge-coupled device (IRCCD) 1040, as shown by the outer rays. The far-field (FF) image, or Fourier image, was taken by moving the first lens 1020 down (to position 1020') so as to form the far-field image in its back-focal plane (Fourier plane) and inserting a second lens 1030 to project the far-field image onto the IRCCD 1040, as shown by the inner rays.

Figure 10B:
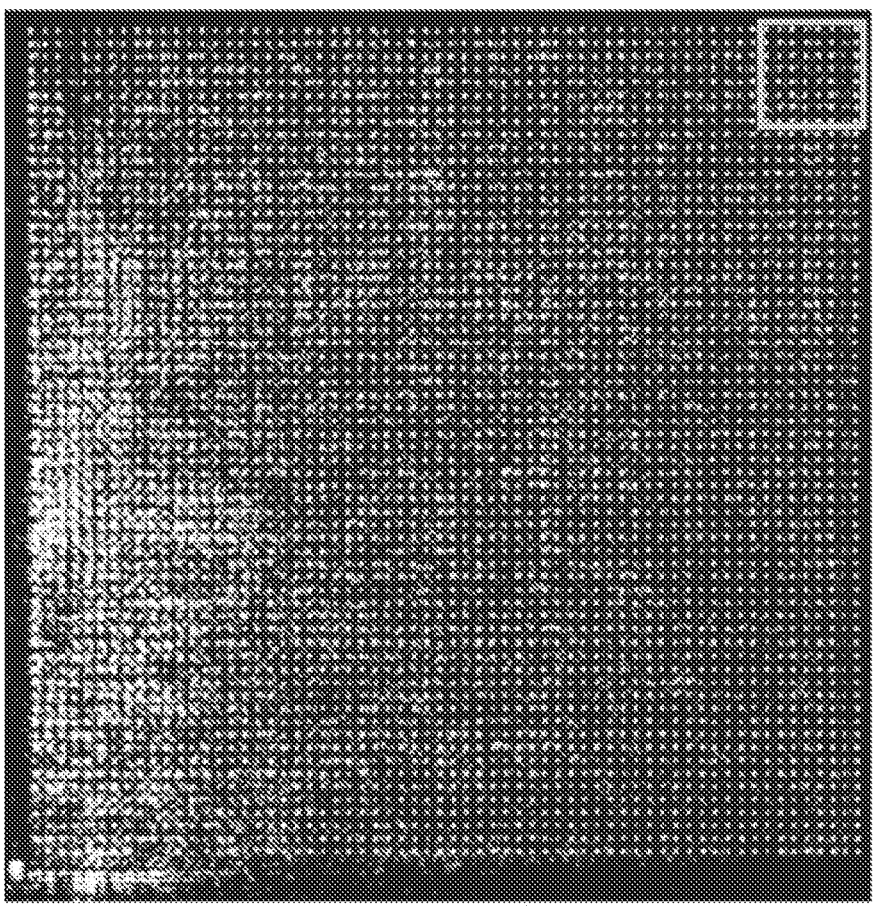
FIG. 10B is a near-field image of the optical phased array shown in FIG. 8A obtained using the imaging system of FIG. 10A.
Figure 10C:
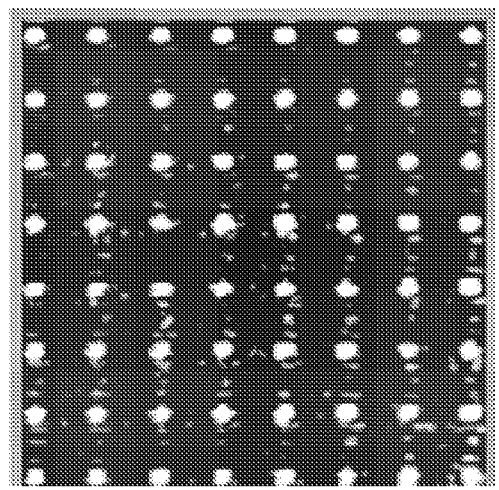
FIG. 10C is a close-up view of an 8×8 pixel portion of the near field shown in FIG. 10B.
Figure 10D:
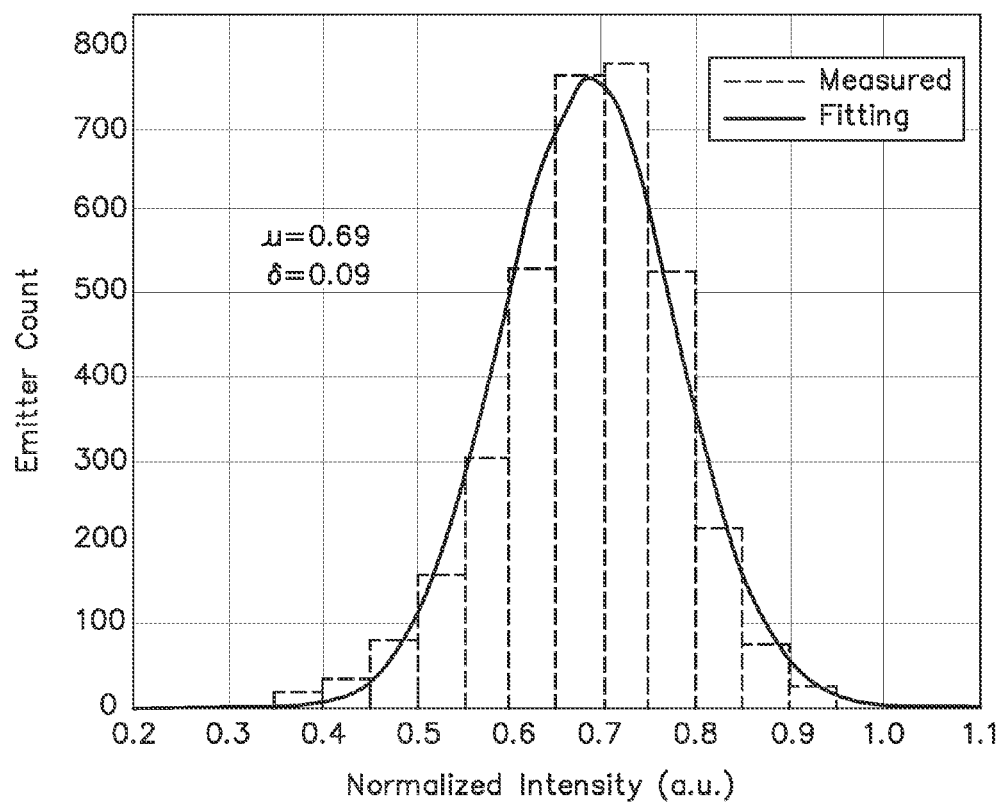
FIG. 10D is a histogram of the measured intensity distribution of the optical emission from the pixels in the optical phased array.
Figure 10F:
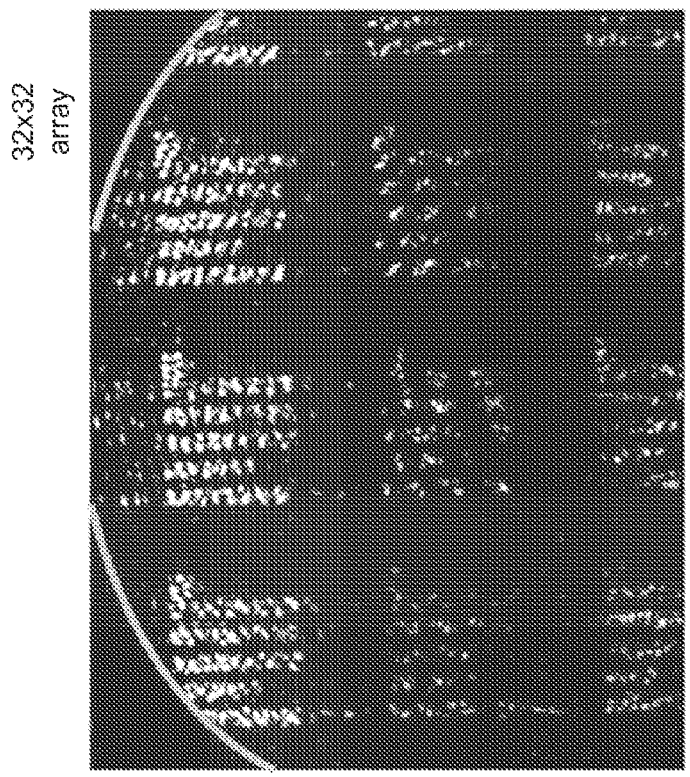
FIG. 10F is a far-field (Fourier-plane) image of a 32×32 pixel portion of the optical phased array shown in FIG. 8B obtained using the imaging system of FIG. 10A.
Figure 10E:
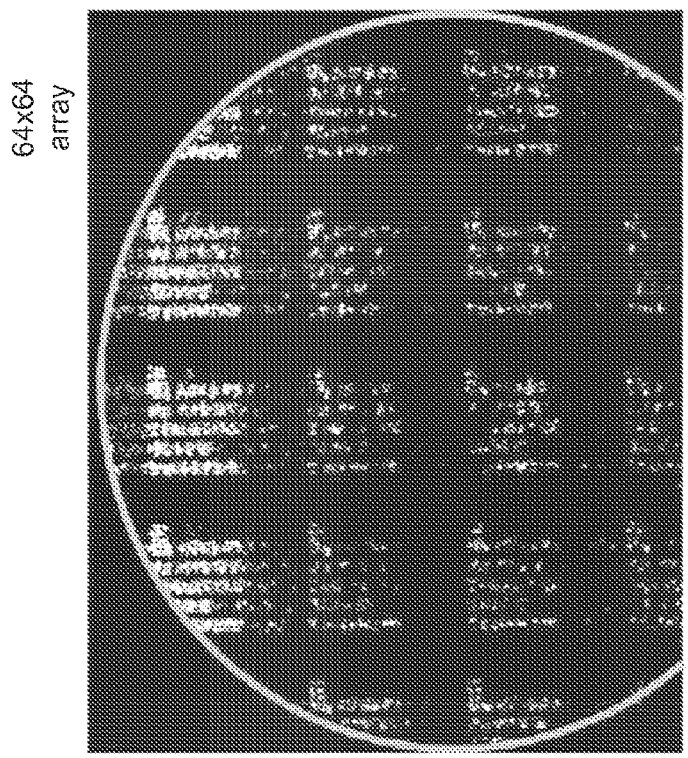
FIG. 10E is a far-field (Fourier-plane) image of the optical phased array shown in FIG. 1B obtained using the imaging system of FIG. 10A.

FIGS. 10B-10F represent data obtained using the system 1000 of FIG. 10A. The near-field image, which is of the plane of the optical phased array, in FIG. 10B shows uniform emission across all of the 64×64 (4,096) nanoantennas. The input bus waveguide is located on the top left corner, causing some excess scattering noise. The scattering noise does not reflect non-uniformity in the array itself and can readily be addressed with a larger separation from the fiber input. FIG. 10C is a close-up view of part of the near field, containing 8×8 pixels; it shows a high degree of uniformity in the amplitudes of the antenna outputs.

FIG. 10D is a histogram representing the measured intensity distribution of the optical emission from the pixels. The statistics show that the standard deviation(s) ($\sigma$) of the emission intensity is 13% of the average intensity ($\mu$).

FIG. 10E shows the measured far-field radiation pattern of the fabricated 64×64 nanophotonic phased array. The image reveals that the desired radiation pattern (in this case, the MIT logo) appears in the far field. The far-field image is clamped by the finite numerical aperture (0.4) of lens 1020 in FIG. 10A. This is also predicted by simulations, as shown by the circles in FIGS. 4C and 4D, which show that emission within a small divergence angle from vertical (surface normal to the nanophotonic phased array chip) can be captured. The intensity noise in the background of the far-field image comes from the light scattering caused by fiber-to-waveguide coupling. The scattered light is also responsible for the concentric fringes in the background, through the interference of the scattered light between the top and bottom surfaces of the silicon-on-insulator wafer. This noise can be reduced by placing the fiber-waveguide coupler farther from the NPA system to reduce the light scattering captured by the imaging column, and a much cleaner far-field radiation pattern would be expected.

FIG. 10F shows the far-field radiation pattern of a 32×32 nanophotonic phased array on the same chip as the 64×64 nanophotonic phased array. FIG. 10F shows less noise because the 32×32 nanophotonic phased array is farther away from the fiber coupling point; however, the far-field pattern resolution is lower because the 32×32 nanophotonic phased array contains fewer pixels than the 64×64 nanophotonic phased array. The measured images agree with the simulations in FIGS. 4C and 4D in terms of the shape of the pattern (MIT logo) and the relative intensity of all interference orders, highlighting the robustness of the nanophotonic phased array design and the accuracy of the fabrication.

Comparing FIG. 10B with FIG. 10E shows that the near-field image of the nanophotonic phased array contains plain uniform emission everywhere, whereas the far field comprises an image with the MIT logo. Until now, image information has generally been stored and transmitted through the intensity of the pixels; in contrast, this large-scale nanophotonic phased array technology opens up another dimension for imaging: the image information is now encoded in the optical phase of the pixels, much like a hologram, but generated from a single point. This demonstration, as a static phased array capable of generating truly arbitrary radiation patterns, has applications in, for example, complex beam generation and mode matching in optical space-division multiplexing.

FIGS. 11A-11E show the phase distribution (top row), simulated far field radiation pattern (middle row), and measured far field radiation pattern (bottom row) for an active 8×8 nanophotonic phased array like the arrays shown in FIGS. 2A and 3A. Phase and intensity scales appear at right. In the top row, each dot represents a different antenna element/pixel. In the middle and bottom rows, the circle indicates the edge of the lens (numerical aperture=0.4), and the box specifies the area of one interference order. (Aliased higher orders appear in the far field because the antenna pitch is greater than the free-space wavelength.)

Figures 11D, 11E:
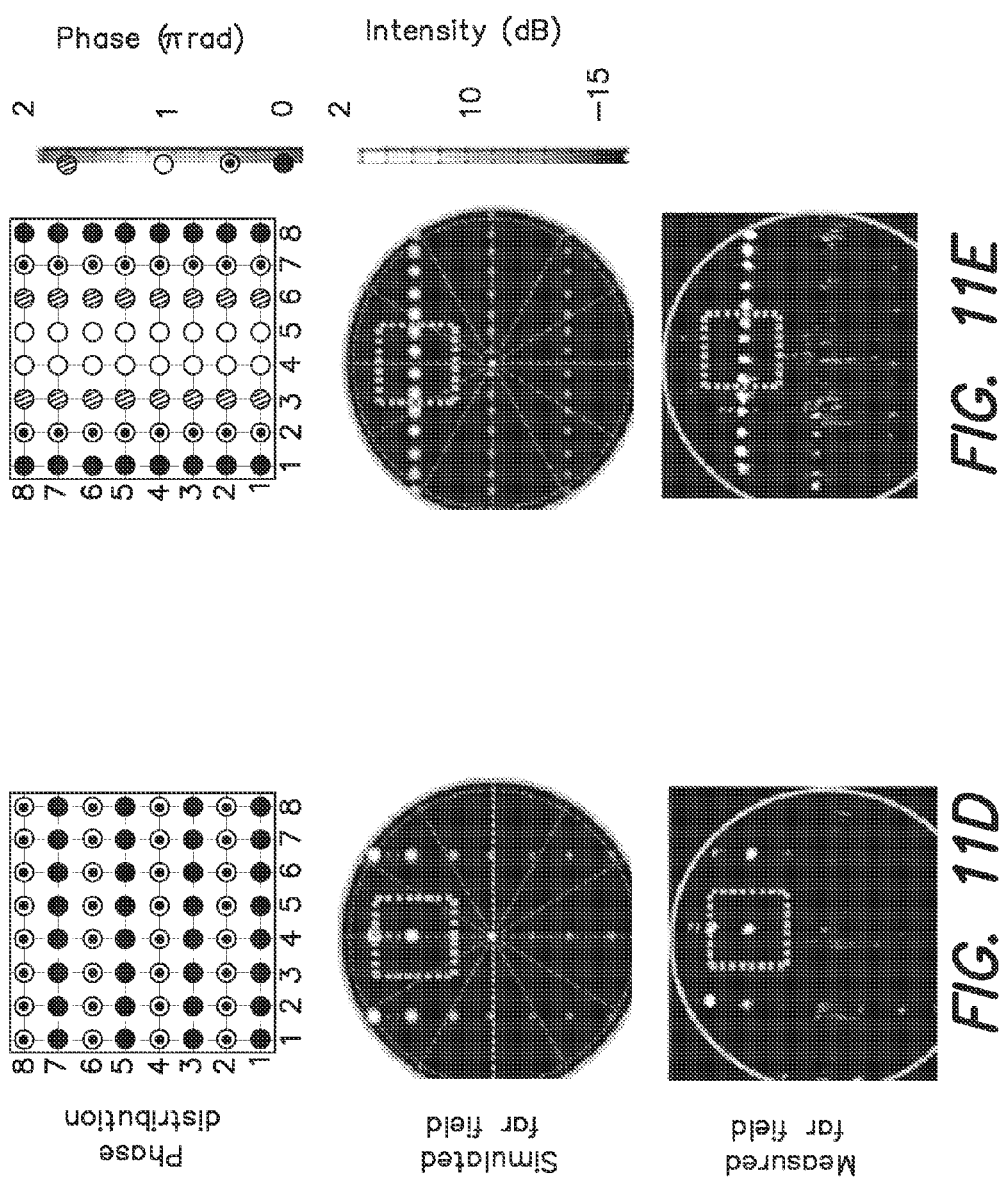

In FIG. 11A, the phase distribution across is uniform at 0, so the array projects a uniform beam at boresight (in the center of the dashed box). Applying square-wave phase distributions stepped vertically and horizontally between 0 and π steers the focused beam by 6° to the edge of each interference order in the vertical direction (FIG. 11B) and the horizontal direction (FIG. 11C), respectively. Applying square-wave phase distributions stepped vertically between 0 and π/2 splits the beam vertically into two beams as shown in FIG. 11D. And applying one period of a horizontally oriented triangle wave that varies between 0 and π splits a single beam into four beams in the horizontal direction as shown in FIG. 11E.

FIGS. 11A-11E show good agreement between simulation and experiment, which confirms the robustness of the nanophotonic phased array as well as the accuracy of the fabrication and active thermo-optic phase tuning. The active NPA structure can be extended to larger phased arrays (for example 64×64, as discussed above) with independent electrical control of each pixel with the aid of fully CMOS-controlled circuitry to access all of the pixels electrically, to project dynamic patterns in the far field with applications including but not limited to communications, three-dimensional holographic displays, laser detection and ranging (LADAR), biomedical imaging, and interferometry.

Unlike other holographic approaches, such as the metasurface antennas, the optical phased arrays disclosed herein allow separate control over the phase and amplitude of light emission and on-chip, single-point excitation of the nanophotonic emitters, enabling arbitrary holograms to be generated entirely on-chip. Moreover, by guiding light in silicon instead of using free-space light, active manipulation of the optical phase can be directly implemented to achieve dynamic farfield patterns with more flexibility and wider applications, by converting the pixel into a thermally phase-tunable pixel in a CMOS process. For instance, a portion of the silicon light path in each pixel can be lightly doped with an n-type implant to form a resistive heater for thermo-optic phase tuning while maintaining a low loss of light propagation. Two narrow silicon leads with heavy n-doping, providing electrical connections to and thermal isolation from the heater, can be connected to the heater on the inner side of the adiabatic bends to minimize the loss caused by light scattering.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical phased array for forming a far-field radiation pattern from a coherent optical beam having a free-space wavelength $\lambda_0$, the optical phased array comprising:
   at least one waveguide to guide the coherent optical beam; and
   a plurality of antenna elements, disposed in the plane of the at least one waveguide and evanescently coupled to the at least one waveguide, to emit respective portions of the coherent optical beam so as to form the far-field radiation pattern.

2. The optical phased array of claim 1, wherein the at least one waveguide comprises:
   a column waveguide to guide the coherent optical beam in a first direction; and
   at least one row waveguide, evanescently coupled to the column waveguide, to guide a first portion of the coherent optical beam to at least one antenna element in the plurality of antenna elements.

3. The optical phased array of claim 2, wherein the at least one row waveguide comprises:
   a first row waveguide, evanescently coupled to the column waveguide via a first directional coupler having a first coupling efficiency, to guide the first portion of the coherent optical beam having a first amplitude; and
   a second row waveguide, evanescently coupled to the column waveguide via a second directional coupler having a second coupling efficiency, to guide a second portion of the coherent optical beam having a second amplitude.

4. The optical phased array of claim 3, wherein the first coupling efficiency and the second coupling efficiency are selected such that the first amplitude is approximately equal to the second amplitude.

5. The optical phased array of claim 1, wherein the at least one waveguide is formed via a complementary metal-oxide-semiconductor (CMOS) process.

6. The optical phased array of claim 1, wherein the plurality of antenna elements are spaced at a pitch about equal to an integer multiple of $\lambda_0/2$.

7. The optical phased array of claim 1, wherein the plurality of antenna elements are spaced at a pitch of less than or equal to about $\lambda_0/2$.

8. The optical phased array of claim 1, wherein the respective portions of the coherent optical beam emitted by the plurality of antenna elements are of approximately equal amplitude.

9. The optical phased array of claim 1, further comprising:
at least one variable optical delay line, in optical communication with at least one antenna element in the plurality of antenna elements, to shift a phase of a corresponding portion of the coherent optical beam so as to vary an amplitude distribution of the far-field radiation pattern and/or to compensate for phase error in the at least one waveguide.

10. The optical phased array of claim 9, further comprising:
at least one heater, in thermal communication with the at least one variable optical delay line, to heat at least a portion of the at least one variable optical delay line so as to change the shift in phase imparted on the corresponding portion of the coherent optical beam by the at least one variable optical delay line.

11. The optical phased array of claim 10, wherein the at least one heater comprises a resistive heater formed in a doped semiconductor.

12. The optical phased array of claim 10, further comprising:
a controller, operably coupled to the at least one heater, to control a temperature of the at least one heater so as to vary the far-field radiation pattern via a change in the shift in phase imparted on the corresponding portion of the coherent optical beam by the at least one variable optical delay line.

13. The optical phased array of claim 9, further comprising:
a grating, in optical communication with the at least one variable optical delay line, to diffract at least part of the corresponding portion of the coherent optical beam so as to form the far-field radiation pattern.

14. The optical phased array of claim 13, wherein the grating has a full-width, half-maximum diffraction bandwidth of at least about 100 nm.

15. The optical phased array of claim 13, wherein the grating is configured to suppress resonant back-reflection of the corresponding respective portion of the coherent optical beam.

16. A method of creating a far-field radiation pattern in the far field of an optical phased array from a coherent optical beam having a free-space wavelength $\lambda_0$, the optical phased array comprising at least one waveguide and a plurality of antenna elements disposed in a plane of the at least one waveguide, the method comprising:
(A) guiding the coherent optical beam via the at least one waveguide;
(B) evanescently coupling respective portions of the coherent optical beam from the at least one waveguide to respective antenna elements in the plurality of antenna elements; and
(C) emitting the respective portions of the coherent optical beam from the respective antenna elements so as to produce the far-field radiation pattern.

17. The method of claim 16, wherein:
(A) comprises evanescently coupling a first portion of the coherent optical beam from a column waveguide to at least one row waveguide, and
(B) comprises evanescently coupling the respective portions of the coherent optical beam from the at least one row waveguide to the respective antenna elements.

18. The method of claim 17, wherein (A) comprises:
(A1) evanescently coupling the first portion of the coherent optical beam from the column waveguide to a first row waveguide via a first directional coupler having a first coupling efficiency, the first portion of the coherent optical beam having a first amplitude; and
(A2) evanescently coupling a second portion of the coherent optical beam from the column waveguide to a second row waveguide via a second directional coupler having a second coupling efficiency, the second portion of the coherent optical beam having a second amplitude and the second coupling efficiency being selected such that the second amplitude is approximately equal to the first amplitude.

19. The method of claim 16, wherein (A) comprises:
coupling the coherent optical beam from the coherent light source into a first waveguide formed via a complementary metal-oxide-semiconductor (CMOS) process.

20. The method of claim 16, wherein (B) comprises:
coupling respective portions of approximately equal amplitude from the at least one waveguide to the plurality of antenna elements.

21. The method of claim 16, wherein (C) comprises:
emitting the respective portions of the coherent optical beam from the plurality of antenna elements at a pitch about equal to an integer multiple of $\lambda_0/2$.

22. The method of claim 16, wherein (C) comprises:
emitting the respective portions of the coherent optical beam from the plurality of antenna elements at a pitch of less than or equal to about $\lambda_0/2$.

23. The method of claim 16, further comprising:
shifting a phase of at least one of the respective portions of the coherent optical beam with at least one optical delay line in optical communication with a first antenna element in the plurality of antenna elements so as to vary the far-field radiation pattern and/or to compensate for phase error in the at least one waveguide.

24. The method of claim 23, further comprising:
heating at least a portion of the at least one optical delay line so as to change the shift in phase imparted on the at least one of the respective portions of the coherent optical beam by the at least one optical delay line.

25. An optical phased array to form a far-field radiation pattern from a coherent optical beam having a free-space wavelength of about $\lambda_0$, the optical phased array comprising:
a substrate;
a column waveguide, formed in or on the substrate, to guide the coherent optical beam;
a plurality of directional couplers, formed in or on the substrate, to evanescently couple respective portions of the coherent optical beam from the column waveguide so as to produce a plurality of row beams;
a plurality of row waveguides, formed in or on the substrate, each row waveguide in the plurality of row waveguides in optical communication with a corresponding directional coupler in the plurality of directional couplers, to guide the plurality of row beams;
a plurality of phase shifters, formed in or on the substrate, each phase shifter in the plurality of phase shifters evanescently coupled to a corresponding row waveguide in the plurality of row waveguides and configured to impart a corresponding phase shift to a corresponding portion of the corresponding row beam in the plurality of row beams so as to produce a corresponding phase-shifted beam;
a plurality of antenna elements, formed in or on the substrate, each antenna element in the plurality of antenna elements in optical communication with a corresponding phase shifter in the plurality of phase shifters and configured to emit the corresponding phase-shifted beam at an angle with respect to the substrate so as to form the far-field radiation pattern; and a plurality of independently controllable heaters, each independently controllable heater in the plurality of independently controllable heaters in thermal communication with a corresponding phase shifter in the plurality of phase shifters and configured to heat the respective phase shifter so as to vary the corresponding phase shift in order to vary the far-field radiation pattern and/or to compensate for phase error in the column waveguide and/or the plurality of row waveguides.

26. The optical phased array of claim 25, wherein each directional coupler in the plurality of directional couplers has a length selected such that the row beams in the plurality of row beams have approximately equal amplitudes.

27. The optical phased array of claim 25, wherein the plurality of antenna elements comprises at least about 4096 antenna elements.

\* \* \* \* \*